(12) United States Patent
Otsuka

(10) Patent No.: US 11,886,290 B2
(45) Date of Patent: Jan. 30, 2024

(54) INFORMATION PROCESSING APPARATUS AND INFORMATION PROCESSING METHOD FOR ERROR CORRECTION AND READ MODIFY WRITE PROCESSING

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 73 days.

(21) Appl. No.: 17/638,933

(22) PCT Filed: Apr. 10, 2020

(86) PCT No.: PCT/JP2020/016215
§ 371 (c)(1),
(2) Date: Feb. 28, 2022

(87) PCT Pub. No.: WO2021/075076
PCT Pub. Date: Apr. 22, 2021

(65) Prior Publication Data
US 2022/0291993 A1    Sep. 15, 2022

(30) Foreign Application Priority Data
Oct. 15, 2019   (JP) .................. 2019-189026

(51) Int. Cl.
*G06F 11/10*   (2006.01)
*G06F 12/02*   (2006.01)

(52) U.S. Cl.
CPC ........ *G06F 11/1056* (2013.01); *G06F 12/023* (2013.01); *G06F 2201/87* (2013.01); *G06F 2212/251* (2013.01)

(58) Field of Classification Search
None
See application file for complete search history.

(56) References Cited

U.S. PATENT DOCUMENTS 6,701,480 B1 *   3/2004   Karpuszka .......... G06F 11/1056
                                                                714/766
7,363,442 B2 *   4/2008   Barnum .............. G06F 13/1673
                                                                711/155
(Continued)

FOREIGN PATENT DOCUMENTS

JP       04337857 A       11/1992
JP       2009289170 A     12/2009
JP       2011054221 A      3/2011

OTHER PUBLICATIONS

International Search Report for corresponding PCT Application PCT/JP2020/016215, 2 pages, dated Jul. 28, 2020.

*Primary Examiner* — Charles Rones
*Assistant Examiner* — Ryan Dare
(74) *Attorney, Agent, or Firm* — Matthew B. Dernier, Esq.

(57) ABSTRACT

An information processing apparatus including a memory and a memory controller writing data to the memory in response to a write for writing the data to the memory, in which the memory executes error correction processing for each data of a predetermined data length, and the memory controller executes, in place of the memory, read modify write processing in a case where a data length of the data related to the write instruction is smaller than the predetermined data length.

12 Claims, 20 Drawing Sheets

(56) References Cited

U.S. PATENT DOCUMENTS

| | | |
|---|---|---|
| 8,234,463 B2 | 7/2012 | Ikeuchi |
| 9,342,402 B1* | 5/2016 | Ong .................... G06F 13/1668 |
| 2006/0112321 A1* | 5/2006 | Leung ................. G06F 11/1056 |
| | | 714/E11.051 |
| 2009/0300297 A1 | 12/2009 | Ikeuchi |
| 2010/0290150 A1* | 11/2010 | Sumi .................... G06F 3/0676 |
| | | 711/155 |
| 2017/0060678 A1* | 3/2017 | Jeganathan ......... G06F 11/1056 |

* cited by examiner

FIG. 1

METHOD FOR EFFICIENTLY PROCESSING WRITE OF SMALL DATA TO MEMORY

TABLE OF CONTENTS
- BACKGROUND, AND PURPOSE AND APPLICATIONS
- KNOWN Masked write EXECUTION TECHNIQUE
- MAIN FEATURES OF EMBODIMENTS OF PRESENT INVENTION
- CONFIGURATION DIAGRAM OF Memory Controller OF PRESENT SCHEME
- KNOWN DRAM ACCESS PROCESSING METHOD
- EXAMPLE OF DRAM ACCESS OF PRESENT SCHEME
- IMPLEMENTATION TARGET

FIG. 2

METHOD FOR EFFICIENTLY PROCESSING WRITE OF SMALL DATA TO MEMORY

· BACKGROUND

- IN SEMICONDUCTOR MEMORIES SUCH AS DRAM, MINIATURIZED MEMORY CELLS AND INCREASED TRANSFER BIT RATE HAVE INCREASED POSSIBILITY OF UNINTENDED DATA ALTERATIONS (DATA CORRUPTION ERRORS).
- ERROR CORRECTING CODE (ECC) HAS BEEN USED AS TECHNIQUE FOR DEALING WITH UNINTENDED DATA ALTERATIONS. FIRST, FOR PREDETERMINED DATA SIZE, ERROR CORRECTING CODE (ECC) VALUE IS CALCULATED AND GENERATED, AND ADDED TO ORIGINAL DATA, AND RESULTANT DATA IS SAVED TO MEMORY. AT TIME OF MEMORY READ, ECC VALUE IS RETRIEVED ALONG WITH DATA, AND CALCULATION IS EXECUTED TO DETERMINE WHETHER ERROR IS PRESENT IN DATA ACQUIRED. IN RESPONSE TO DETECTION OF ERROR, DATA IS RESTORED TO MAXIMUM EXTENT.
- IN RELATED ART, GENERATION AND CALCULATION OF ECC VALUE AND ERROR RESTORATION (HEREINAFTER REFERRED TO AS ECC PROCESSING) ARE OFTEN EXECUTED ON SIDE OF MEMORY CONTROLLER BUILT IN SOC CHIP OUTSIDE DRAM AS NECESSARY ON BASIS OF DATA RELIABILITY REQUIRED FOR SYSTEM. HOWEVER, INCREASINGLY MINIATURIZED MEMORY CELLS HAVE GROWN NEED TO BUILD CIRCUIT FOR ECC PROCESSING INSIDE DRAM CHIP AND TO CONSTANTLY CORRECT ERRORS.
- IN CASE WHERE DRAM IS ACCESSED USING PREDETERMINED DATA LENGTH (BURST LENGTH) CORRESPONDING TO ECC PROCESSING UNIT, TIME REQUIRED FOR ECC PROCESSING CAN BE CONCEALED IN MANY CASES BY USING PIPELINE PROCESSING TO EXECUTE ACCESS TO MEMORY CELLS, ECC PROCESSING, AND TRANSFER INTO AND OUT OF DRAM CHIP IN PARALLEL.
- HOWEVER, IN CASE WHERE DATA OF SMALL SIZE DIFFERENT FROM ABOVE-DESCRIBED PREDETERMINED DATA LENGTH, ECC PROCESSING TIME IS MANIFESTED. THIS IS BECAUSE, FOR EXAMPLE, FOLLOWING PROCESSING IS REQUIRED. FIRST, DATA OF ABOVE-DESCRIBED DATA LENGTH IS READ FROM CORRESPONDING REGION OF WRITE TARGET, THEN DATA OF PREDETERMINED SIZE IS PARTLY OVERWRITTEN WITH SMALL SIZE DATA, ECC VALUE IS RECALCULATED, AND FINALLY DATA OF PREDETERMINED SIZE IS WRITTEN BACK TO CORRESPONDING REGION ALONG WITH NEW ECC VALUE (THIS IS HEREINAFTER REFERRED TO AS READ MODIFY WRITE). WITHOUT ECC PROCESSING, TECHNIQUE REFERRED TO AS masked write (NEXT PAGE) CAN BE USED TO DIRECTLY WRITE, TO MEMORY ARRAY OF DRAM, DATA OF SIZE SMALLER THAN ABOVE-DESCRIBED PREDETERMINED DATA LENGTH. THIS REQUIRES SHORTER PROCESSING TIME THAN USE OF READ MODIFY WRITE.

· PURPOSE AND APPLICATIONS

- IN PLATFORMS SUCH AS GAMING SYSTEMS WHICH HAVE SPECIFIED PROCESSING CAPABILITIES (HOME GAME MACHINES ETC.), EVEN IN CASE WHERE HARDWARE IS REMODELED AND DRAM AND SOC UTILIZED ARE CHANGED, DRAM ACCESS PERFORMANCE STILL NEEDS TO BE MAINTAINED.
- ASSUMING THAT DRAM REQUIRING NO ECC PROCESSING IN RELATED ART IS REPLACED WITH DRAM REQUIRING ECC PROCESSING, IN CASE WHERE DATA OF SMALL SIZE IS WRITTEN TO DRAM, READ MODIFY WRITE NEEDS TO BE PERFORMED INSTEAD OF masked write, LEADING TO DEGRADED DRAM ACCESS PERFORMANCE OF CORRESPONDING PLATFORM EVEN WITH DRAM PERFORMANCE UNCHANGED OTHER THAN PRESENCE OF ECC PROCESSING. NOTE THAT SUCH DEGRADED PERFORMANCE OCCURS REGARDLESS OF WHETHER ECC PROCESSING IS EXECUTED INSIDE DRAM OR SOC.
- IN LIGHT OF THESE CIRCUMSTANCES, PRESENT INVENTION PROVIDES TECHNIQUE FOR USING DRAM REQUIRING ECC PROCESSING, WHILE ACHIEVING DRAM WRITING PERFORMANCE FOR SMALL SIZE DATA EQUIVALENT TO PERFORMANCE OF DRAM REQUIRING NO ECC PROCESSING OR IMPROVING PERFORMANCE.

F I G . 3
KNOWN METHOD FOR EXECUTING MASKED WRITE

- https://www.jedec.org/standards-documents/dictionary/terms/masked-write-transfer-mwt masked write transfer (MWT)

A write transfer in which the transfer of new data from the serial register into the memory array is controlled by a write mask that is supplied on the DG(n) terminals. This mask allows the selective writing of new data into one or more of the data bit planes of the storage array corresponding to the data bits of the parallel array. In a normal implementation, a high M value enables the writing of new data while a low M inhibits the writing and leaves the existing data unchanged. A new mask value must be supplied for each masked write cycle.

References:
  JESD21-C, 1/97

FIG. 4
METHOD FOR EFFICIENTLY PROCESSING WRITE OF SMALL DATA TO MEMORY

* MAIN FEATURES OF EMBODIMENTS OF PRESENT INVENTION

- IN RESPONSE TO MEMORY WRITE REQUEST FOR DATA LESS THAN PREDETERMINED DATA LENGTH, Memory Controller PERFORMS READ MODIFY WRITE. SPECIFICALLY, INSTEAD OF ISSUING CORRESPONDING ACCESS TO MEMORY, Memory Controller PERFORMS READING OF PREDETERMINED DATA LENGTH, INTEGRATION WITH DATA OF LESS THAN PREDETERMINED DATA LENGTH, AND WRITE OF INTEGRATION RESULT IN PREDETERMINED DATA UNITS.
  - IN RESPONSE TO WRITE REQUEST FOR DATA LESS THAN ECC PROCESSING UNIT SIZE, Memory Controller READ, MODIFY, WRITE.
  - IN RESPONSE TO WRITE REQUEST FOR DATA LESS THAN MEMORY PIPELINE PROCESSING UNIT (BURST LENGTH), Memory Controller READ, MODIFY, WRITE.
- Memory Controller TEMPORARILY HOLDS ACCESS REQUEST AND HOLDS Queue FOR READ MODIFY WRITE PROCESSING
- Memory Controller INCLUDES PLURALITY OF ENTRIES IN Queue FOR READ MODIFY WRITE PROCESSING AND EXECUTE PLURALITY OF STEPS OF READ MODIFY WRITE PROCESSING IN PARALLEL TO CONCEAL READ MODIFY WRITE PROCESSING TIME.
- ACCESS REQUEST SOURCE CONSIDERS CORRESPONDING ACCESS PROCESSING TO BE COMPLETE WHEN Memory Controller RECEIVES MEMORY WRITE REQUEST FOR DATA LESS THAN PREDETERMINED DATA LENGTH, AND CAN EXECUTE SUBSEQUENT PROCESSING Memory Controller.
- Memory Controller DOES NOT NECESSARILY MATCH ARRIVAL ORDER WITH EXECUTION ORDER FOR MEMORY ACCESS REQUEST IN EXECUTING PROCESSING, BUT MAINTAINS DATA CONSISTENCY.
- Memory Controller INTEGRATES PLURALITY OF MEMORY WRITE REQUESTS FOR LESS THAN PREDETERMINED DATA LENGTHS AND PERFORM READ MODIFY WRITE ON MEMORY WRITE REQUESTS AT TIME.
- Memory Controller WRITES RESULT OF READ MODIFY WRITE PROCESSING TO MEMORY IN DELAYED MANNER.
- Memory Controller SCHEDULES MEMORY ACCESS ORDER BY REDUCING FREQUENCY OF ACCESS TO MEMORY ARRAY AND MEMORY ACCESS DATA BUS DURING READ MODIFY WRITE TO LOWER PRIORITY OF AND DELAY READ MODIFY WRITE PROCESSING, IMPROVING INTEGRATED MEMORY ACCESS PERFORMANCE INCLUDING PERFORMANCE FOR OTHER ACCESSES.
- WHILE READ OF PREDETERMINED DATA LENGTH INCLUDED IN READ MODIFY WRITE IS BEING DELAYED, IN RESPONSE TO REQUEST FOR READ FROM CORRESPONDING ADDRESS, Memory Controller CHANGES SCHEDULING OF ACCESS ORDER TO PRIORITIZE CORRESPONDING READING.
- BEFORE COMPLETION OF WRITE OF READ MODIFY WRITE RESULT TO MEMORY, IN RESPONSE TO READ REQUEST FOR CORRESPONDING REGION, Memory Controller DELIVERS DATA FROM Queue ENTRIES.
- DURING DELAYAL OF WRITE OF INTEGRATION RESULT TO MEMORY IN PREDETERMINED DATA UNITS, INCLUDED IN READ MODIFY WRITE, IN RESPONSE TO DECREASE IN NUMBER OF EMPTY ENTRIES IN Queue, Memory Controller CHANGES SCHEDULING OF MEMORY ACCESS ORDER TO RAISE PRIORITY OF CORRESPONDING WRITING.
- Memory Controller DOES NOT DISCARD CORRESPONDING Queue ENTRY EVEN AFTER ENDING OF READ MODIFY WRITE AND UTILIZES Queue ENTRY FOR DATA SUPPLY IN RESPONSE TO REQUEST FOR READ FROM CORRESPONDING ADDRESS AND FOR INTEGRATION OF WRITES TO CORRESPONDING ADDRESS.
- BY ADJUSTING NUMBER OF ENTRIES IN Queue INCORPORATED IN Memory Controller AND RESIDENCE TIME FOR ENTRY CONTENTS, READ MODIFY WRITE PROCESSING PERFORMANCE CAN BE ADJUSTED.

FIG. 6
CONFIGURATION DIAGRAM OF Memory Controller OF PRESENT SCHEME

REMARKS:
- PROCESSORS SUCH AS CPU/GPU/DSP, DMA ENGINE, Video Enc/Dec ENGINE, Display ENGINE, Peripheral I/O, ETC. ARE CONNECTED VIA SOC ON-CHIP INTERCONNECT AND OPERATE AS BUS MASTER (INITIATOR) TO ISSUE DRAM ACCESS REQUEST.
- PLURALITY OF DRAM ACCESS REQUESTS ARE HELD IN EACH Queue AND ISSUED TO DRAM IN ORDER CONTROLLED BY DRAM access scheduler, LEADING TO DATA I/O. ORDER IN WHICH DRAM ACCESS REQUESTS ARRIVE AT Memory Controller DOES NOT NECESSARILY MATCH ORDER IN WHICH DRAM ACCESS REQUESTS ARE ISSUED TO DRAM. ORDERS ARE CHANGED ON BASIS OF DRAM UTILIZATION EFFICIENCY AND PRIORITY OF ACCESS REQUEST.
- Memory Controller RECEIVES COMMANDS SUCH AS READ REQUEST AND WRITE REQUEST IN COMBINATION WITH ADDRESSES AND DATA, FROM SOC ON-CHIP INTERCONNECT VIA COMMAND LINES NOT DEPICTED.
- IN FIG. 6, unidirectional SIGNALS ARE USED FOR Data bus BETWEEN Memory Controller AND DRAM. HOWEVER, bidirectional SIGNALS MAY BE USED.
- IN FIG. 6, Address queue AND Data queue ARE EACH DIVIDED INTO READ QUEUE, WRITE QUEUE, AND RMW (Read Modify Write) QUEUE. HOWEVER, THESE QUEUES MAY BE INTEGRATED TOGETHER.
- SOC Physical address IS CONVERTED INTO DRAM Command AND Address VIA CONVERTER NOT DEPICTED.
- FIG. 6 ILLUSTRATES CASE WHERE ECC PROCESSING CIRCUIT IS INCORPORATED IN DRAM. HOWEVER, INSTEAD, ECC PROCESSING CIRCUIT MAY BE LOCATED IN DOTTED BOXES ON Memory Controller SIDE.

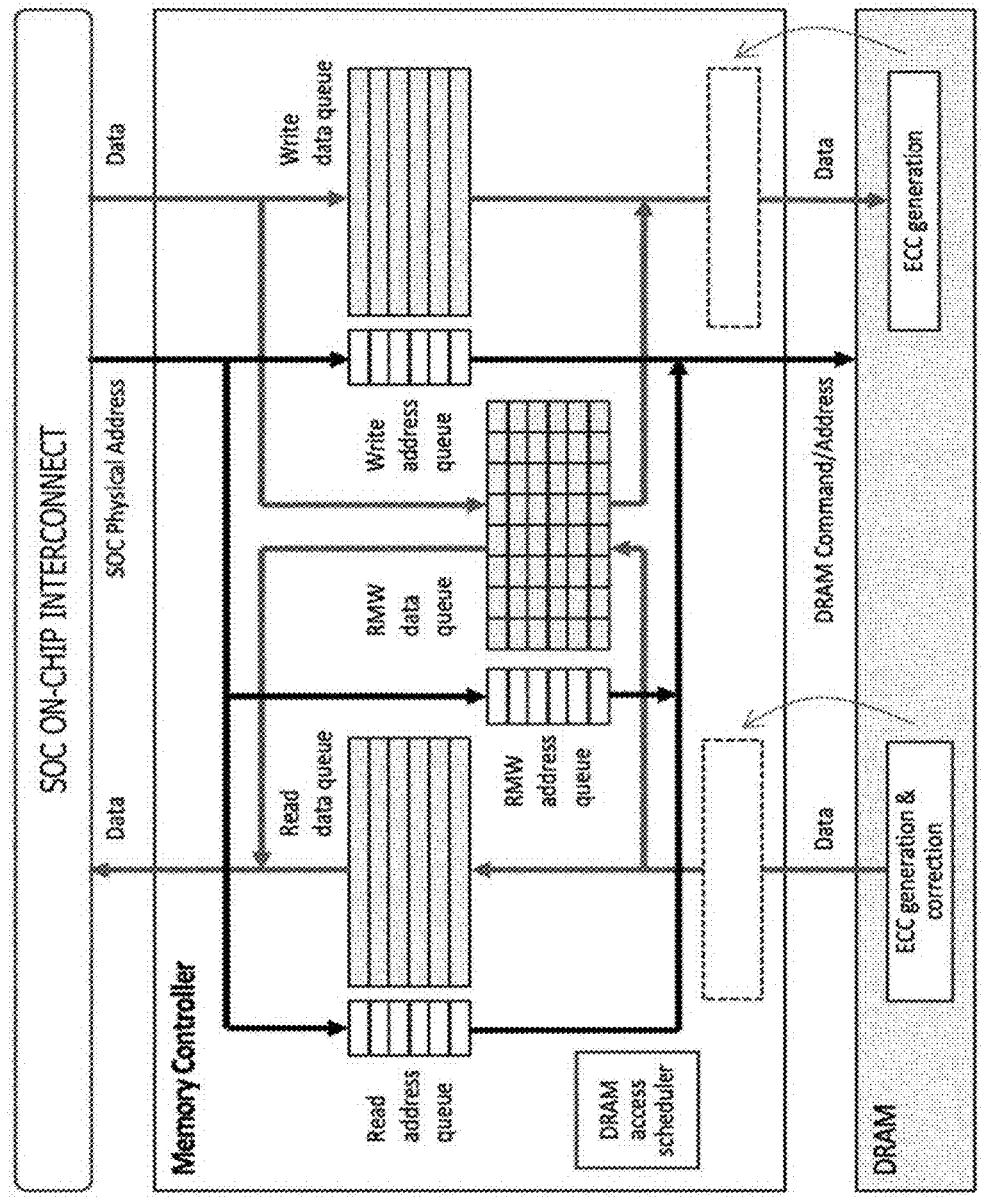

F I G. 7
CONFIGURATION DIAGRAM OF Memory Controller OF PRESENT SCHEME

REMARKS:
- EACH OF Read QUEUE, Write QUEUE, AND RMW QUEUE INCLUDES PLURALITY OF ENTRIES, AND ONE ENTRY INCLUDES TOTAL OF TWO BITS INCLUDING ADDRESS (Adr n) PAIRED WITH BUFFER (Data n) CAPABLE OF HOLDING DATA OF PREDETERMINED DATA LENGTH AND VALID BIT NOT DEPICTED AND INDIVIDUALLY INDICATING WHETHER CORRESPONDING ADDRESS DATA IS HELD. ADDITIONALLY, ARRIVAL ORDER FOR ACCESS REQUESTS IS HELD BY CONSTRUCTING EACH ENTRY UTILIZATION ORDER OR PROVIDING NUMBERING HOLDING BIT NOT DEPICTED IN EACH ENTRY.
- DATA BUFFER FOR RMW MAY INCLUDE PLURALITY OF VALID BITS TO ALLOW PLURALITY OF SMALL DATA TO BE SIMULTANEOUSLY HELD. IN FIG. 7, UP TO EIGHT SMALL DATA CAN BE HELD PER ENTRY CAPABLE OF HOLDING PREDETERMINED DATA (Dn1 TO Dn8), AND IDENTICAL NUMBER OF VALID BITS ARE ALSO PROVIDED. ACCORDINGLY, IN ONE ENTRY, ONE VALID BIT IS PROVIDED FOR ADDRESS AND EIGHT VALID BITS ARE PROVIDED FOR DATA.
- Read QUEUE AND Write QUEUE MAY BE SIMILARLY CONFIGURED OR CAN BE CONFIGURED SUCH THAT ONE ENTRY CAN HOLD ONLY ONE DATA REGARDLESS OF DATA LENGTH AS LONG AS ONE ENTRY IS EQUAL TO OR SMALLER THAN PREDETERMINED DATA LENGTH AS IN FIG. 7.
- DRAM access scheduler REFERENCES VALID ADDRESSES HELD IN Read, Write, AND RMW QUEUES TO CONTROL PROCESSING ORDER FOR ACCESS REQUESTS HELD IN ENTRIES. AT THIS TIME, FOR MAXIMIZED DRAM ACCESS EFFICIENCY, PROCESSING ORDER IS CONTROLLED WITH DRAM BANK PAGE CONFIGURATION, READ AND WRITE CONSECUTIVENESS, READ AND WRITE DATA LENGTH, AND BUS MASTER REQUEST PRIORITY MAINLY TAKEN INTO ACCOUNT. AT THIS TIME, data consistency (data coherency) IS ALSO HELD AS NECESSARY ON BASIS OF REQUEST FROM BUS MASTER. SPECIFICALLY, IF NECESSARY, FOR ACCESS REQUESTS FROM IDENTICAL BUS MASTER, CONTROL IS PROVIDED SUCH THAT ORDER OF WRITE TO AND READ FROM IDENTICAL ADDRESS REGION IS NOT REVERSED.

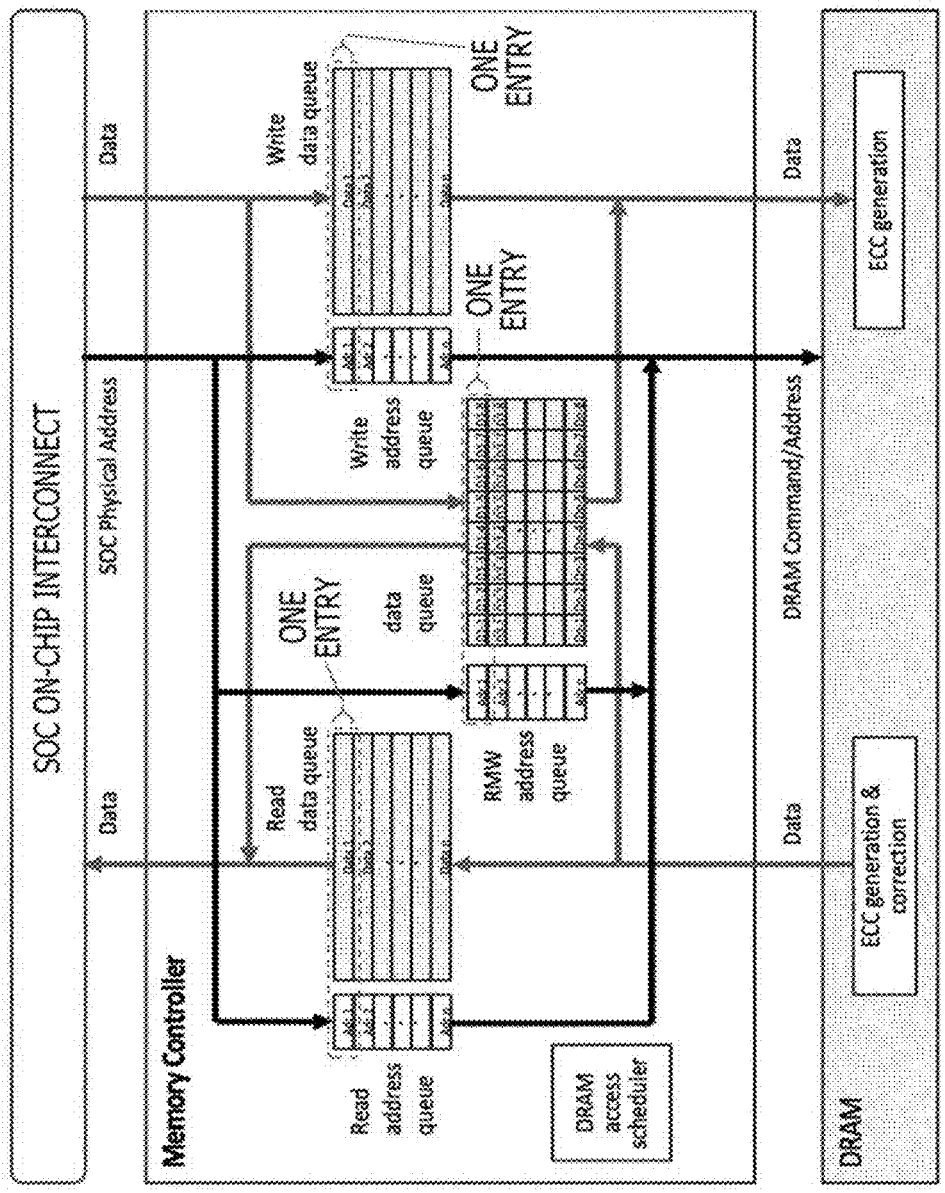

FIG. 8

CONFIGURATION DIAGRAM OF Memory Controller OF PRESENT SCHEME

- NUMBER OF ENTRIES REQUIRED IN RMW address queue AND RMW data queue
  - THE NUMBER OF ENTRIES IN RMW address queue AND RMW data queue MAY BE DETERMINED USING FOLLOWING PARAMETERS AS DETERMINATION MATERIALS.
    - P0:
      BAND TO BE ACHIEVED IN CASE WHERE CONSECUTIVE WRITE OF SMALL SIZE OF LESS THAN PREDETERMINED DATA LENGTH. FOR EXAMPLE, FOR DRAM REQUIRING NO ECC PROCESSING (OTHER TYPES OF PERFORMANCE ARE IDENTICAL), P0 REFERS TO BAND THAT CAN BE ACHIEVED WHEN WRITE REQUESTS OF SMALL SIZES ARE CONSECUTIVELY PERFORMED.
    - P1:
      NUMBER OF STEPS OF READ MODIFY WRITE PROCESSING PER UNIT TIME REQUIRED TO ACHIEVE P0, P1 = P0/(WRITE DATA LENGTH)
    - P2:
      EXPECTED NUMBER OF WRITE REQUESTS OF SMALL SIZES OF LESS THAN PREDETERMINED DATA LENGTH MADE PER UNIT TIME WHICH NUMBER IS ESTIMATED ON BASIS OF USE CASE
    - P3:
      UNDER CONTROL OF DRAM access scheduler, MAXIMUM VALUE OF TIME FOR WHICH WRITE DATA OF SMALL SIZE OF LESS THAN PREDETERMINED DATA LENGTH RESIDES IN RMW data queue (MAXIMUM VALUE OF PROCESSING TIME REQUIRED FOR READ MODIFY WRITE BY Memory Controller). HOLDING TIME 7a DESCRIBED BELOW MAY OR MAY NOT BE INCLUDED.
    - P4:
      UNDER CONTROL OF DRAM access scheduler, MINIMUM VALUE OF TIME FOR WHICH WRITE DATA OF SMALL SIZE OF LESS THAN PREDETERMINED DATA LENGTH RESIDES WHEN READ MODIFY WRITE HAS PRIORITY EQUIVALENT TO PRIORITY OF OTHER PROCESSING.

- NUMBER OF ENTRIES (SPECIFICALLY, MAXIMUM NUMBER OF STEPS OF PARALLEL PROCESSING ENABLED OF PRESENT PROCESSING) IS, FOR EXAMPLE, CALCULATED FROM ANY OF FOLLOWING.
  * WORST CONDITION CONSIDERED ENTRIES N1 = P1 × P3/P0 UNIT TIME
  * MINIMUM NUMBER OF ENTRIES N2 = P2 × P4/P0 UNIT TIME

- CALCULATION EXAMPLE
  * N1 = P1 × P3/P1 UNIT TIME = ((1GB/s)/(4B)) × (2us)/(1s) = 512
  * N2 = P1 × P4/P2 UNIT TIME = (32M/s) × (1us)/(1s) = 32

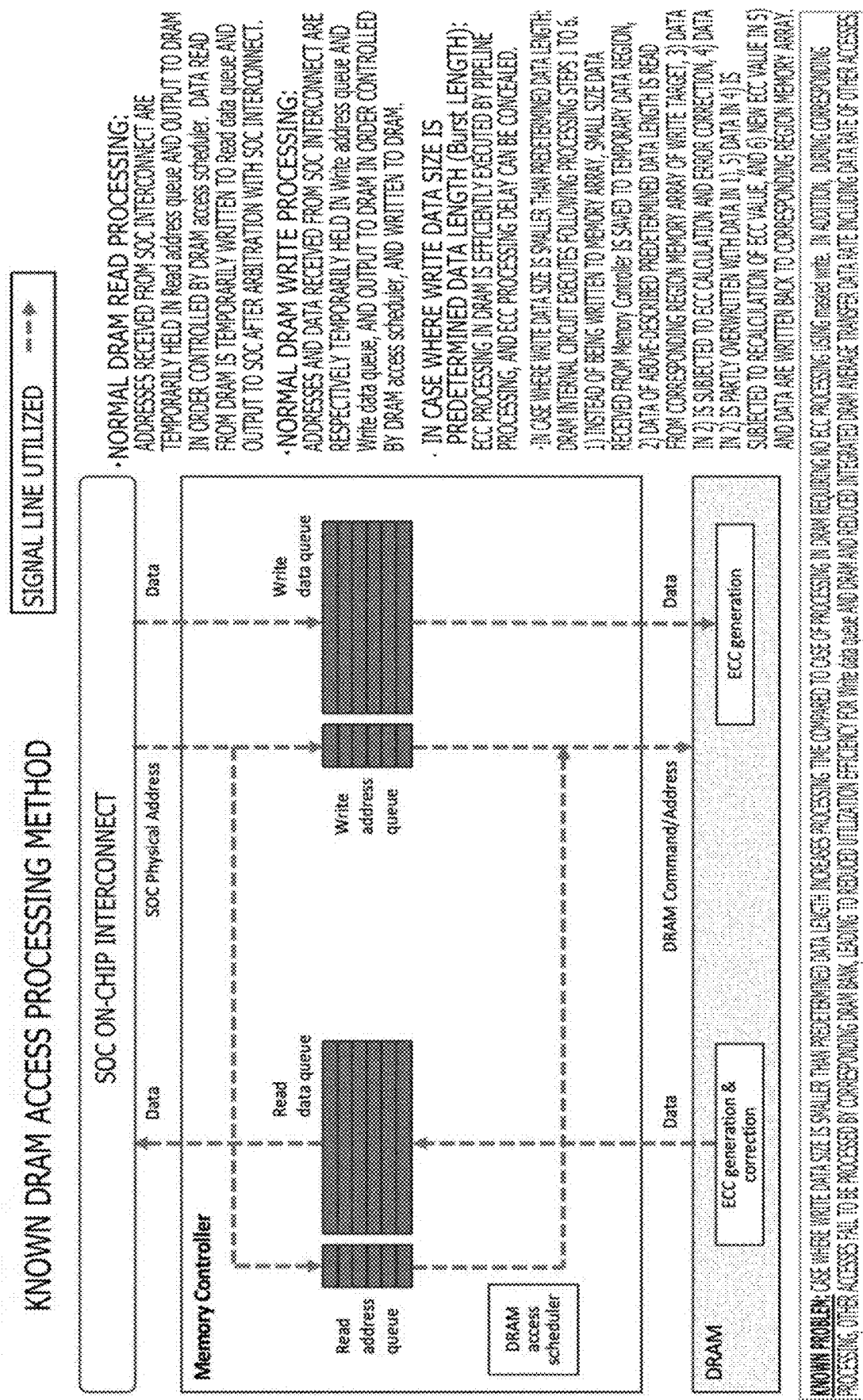
FIG. 9 KNOWN DRAM ACCESS PROCESSING METHOD

EXAMPLE OF DRAM ACCESS OF PRESENT SCHEME
PROCESSING STEPS 1 TO 7

EXAMPLE OF DRAM ACCESS OF PRESENT SCHEME
PROCESSING STEPS 1 TO 7

EXAMPLE OF DRAM ACCESS OF PRESENT SCHEME
PROCESSING STEPS 1 TO 7

EXAMPLE OF DRAM ACCESS OF PRESENT SCHEME
PROCESSING STEPS 1 TO 7

EXAMPLE OF DRAM ACCESS OF PRESENT SCHEME
PROCESSING STEPS 1 TO 7

F I G . 1 7

IMPLEMENTATION TARGET

- MEMORY REQUIRING ECC PROCESSING
  - MEMORIES IN GENERAL REQUIRING ERROR CORRECTING CODE PROCESSING FOR EACH PREDETERMINED DATA LENGTH AND TO WHICH ACCESSES OF DATA LENGTH SMALLER THAN PREDETERMINED DATA LENGTH ARE MADE.
- MEMORY WITH CONSTRICTION ON ACCESS DATA LENGTH
  - MEMORIES IN GENERAL NOT SUPPORTING ACCESSES OF DATA LENGTH SMALLER THAN PREDETERMINED DATA LENGTH
  - MEMORIES IN GENERAL ALLOWING PROCESSING DELAY TO BE CONCEALED FOR PREDETERMINED DATA LENGTH USING PIPELINE PROCESSING ETC. BUT SUFFERING PROCESSING DELAY OR REDUCED THROUGHPUT FOR ACCESSES OF DATA LENGTH SMALLER THAN PREDETERMINED DATA LENGTH.
- GENERAL REQUIREMENTS
  - EXAMPLE IS MAINLY DESCRIBED IN CONJUNCTION WITH DRAM, BUT PRESENT SCHEME MAY BE APPLIED TO MRAM, ReRAM (RRAM), FeRAM (FRAM), Xpoint, NAND Flash, SRAM, ETC. THAT REQUIRE SIMILAR PROCESSING
  - FOR DRAM, PRESENT SCHEME CAN BE APPLIED TO GDDR6, DDR5, LPDDR5, ETC.
  - IN EXAMPLE, PREDETERMINED DATA LENGTH AND SMALL SIZE DATA LENGTH ARE AS FOLLOWS.
    - PREDETERMINED DATA LENGTH: 32 BYTES
    - SMALL SIZE DATA LENGTH: 4 BYTES, 8 BYTES

FIG. 19

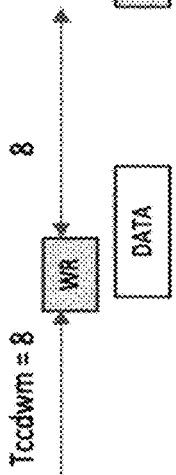
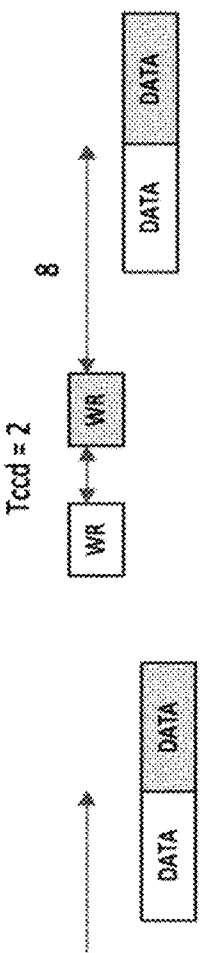

(a) CURRENT GDDR6 Masked Write — $T_{ccd} = T_{ccdwm} = 2$ (b) On die ECC GDDR6 Masked Write — $T_{ccdwm} = 8$ (c) IN CASE WHERE MEMORY CONTROLLER EXECUTES RMW
RD AND WR REQUIRED FOR RMW ARE MADE CONSECUTIVE ON back-to-back BASIS (SUCH SCHEDULING IS USED TO MINIMIZE COST). — $T_{ccd} = 2$ (d) $T_{ccd} = 2$

RD: READ REQUEST COMMAND
WR: WRITE REQUEST COMMAND
DATA: TRANSFER DATA

☐ OTHER ACCESSES
▨ CORRESPONDING ACCESS

- PROPERTIES OF MEMORY (CURRENT GDDR6) REQUIRING NO ECC PROCESSING
  NUMBER OF CLOCK CYCLES REQUIRED TO RECEIVE BURST LENGTH DATA WRITE REQUEST: 2
  NUMBER OF CLOCK CYCLES REQUIRED TO RECEIVE DATA WRITE REQUEST OF LESS THAN BURST LENGTH: 2
  NUMBER OF CLOCK CYCLES FROM DATA WRITE REQUEST UNTIL INITIATION OF DATA TRANSFER: 7

- PROPERTIES OF MEMORY (ON die ECC GDDR6) REQUIRING ECC PROCESSING
  NUMBER OF CLOCK CYCLES REQUIRED TO RECEIVE BURST LENGTH DATA WRITE REQUEST: 2
  NUMBER OF CLOCK CYCLES REQUIRED TO RECEIVE DATA WRITE REQUEST OF LESS THAN BURST LENGTH: 8
  NUMBER OF CLOCK CYCLES FROM DATA WRITE REQUEST UNTIL INITIATION OF DATA TRANSFER: 8

INFORMATION PROCESSING APPARATUS AND INFORMATION PROCESSING METHOD FOR ERROR CORRECTION AND READ MODIFY WRITE PROCESSING

TECHNICAL FIELD

The present invention relates to an information processing apparatus and an information processing method.

BACKGROUND ART

In recent years, with miniaturized memory cells and increased transfer bit rate in semiconductor memories such as dynamic random access memories (DRAMs), there has been an increasing possibility of unintentional data alterations (data corruption errors).

In the related art, an error-correcting code (ECC) is used as a technology for dealing with unintentional data alterations. First, for a predetermined data size, an ECC value is calculated and generated and is added to the original data, and resultant data is saved in a memory. For memory read, the ECC value is retrieved along with data, and calculation is executed to check whether the data acquired has an error. In response to detection of an error, the data is restored to a possible extent.

In the related art, generation and calculation of the ECC value and restoration from errors (hereinafter referred to as ECC processing) are often performed as necessary on the side of a memory controller built in a system on chip (SOC) or the like outside the DRAM, on the basis of data reliability required for a system. However, increasingly miniaturized memory cells increase the need to build, into a DRAM chip, a circuit that executes ECC processing to constantly correct errors.

In a case where the DRAM is accessed on the basis of a predetermined data length (burst length) corresponding to an ECC processing unit, then in many cases, the time required for the ECC processing can be concealed by using pipeline processing to execute access to memory cells, the ECC processing, and transfer into and out of the DRAM chip in parallel.

SUMMARY

Technical Problems

However, in a case where data of a small size different from the predetermined data length is written to the DRAM, the ECC processing time is manifested. This is because, for example, the following processes have to be performed. First, data of the predetermined data length is read from the region on which write is to be executed. Then, the data of the predetermined size having been read is partly overwritten with small size data, and the ECC value is recalculated. Finally, the data of the predetermined size is written back to the corresponding region along with a new ECC value (this is hereinafter referred to as read modify write).

Note that, without ECC processing, a technique referred to as masked write can generally be used to write, directly to a memory array in the DRAM, data of a size smaller than the predetermined data length. This requires a shorter processing time than execution of the read modify write.

In the masked write, when new data is transferred from a serial register to a memory array, write transfer is controlled by a write mask. The mask enables the new data to be selectively written to one or more data bit planes in a storage array corresponding to data bits (see, for example, description of JESD21-C, 1/97 in FIG. 3).

In light of the above-described circumstances, an object of the present invention is to provide an information processing apparatus and an information processing method that use a DRAM requiring ECC processing and that, for DRAM writing performance for data of a size smaller than an ECC processing unit, make the performance of the DRAM requiring ECC processing equivalent to or better than the performance of a DRAM requiring no ECC processing.

Solution to Problems

An aspect of the present invention solving the problems with the related art provides an information processing apparatus including a memory and a memory controller writing data to the memory in response to a write instruction for writing the data to the memory, in which the memory executes error correction processing for each data of a predetermined data length, and the memory controller executes, in place of the memory, read modify write processing in a case where a data length of the data related to the write instruction is smaller than the predetermined data length.

Advantageous Effects of Invention

According to the present invention, a DRAM requiring ECC processing is used, and for DRAM writing performance for data of a size smaller than an ECC processing unit, the performance of the DRAM requiring ECC processing is made equivalent to or better than the performance of a DRAM requiring no ECC processing.

BRIEF DESCRIPTION OF DRAWINGS

FIG. 1 is an explanatory diagram illustrating the order of description of an embodiment of the present invention.

FIG. 2 is an explanatory diagram describing the background, object, and the like of an embodiment of the present invention.

FIG. 3 is an explanatory diagram illustrating a description example of a masked write scheme to be compared with an embodiment of the present invention.

FIG. 4 is an explanatory diagram illustrating an overview of an embodiment of the present invention.

FIG. 6 is an explanatory diagram illustrating a configuration example of a memory controller of an embodiment of the present invention.

FIG. 7 is an explanatory diagram illustrating a configuration example of the memory controller of an embodiment of the present invention.

FIG. 8 is an explanatory diagram describing a configuration example of the memory controller of an embodiment of the present invention.

FIG. 9 is an explanatory diagram illustrating an example of a known control method to be compared with an embodiment of the present invention.

FIG. 17 is an explanatory diagram illustrating an applied example of the memory controller according to an embodiment of the present invention.

FIG. 19 depicts explanatory diagrams illustrating examples of operation timings for the memory controller according to an embodiment of the present invention.

DESCRIPTION OF EMBODIMENTS

Figure 5:
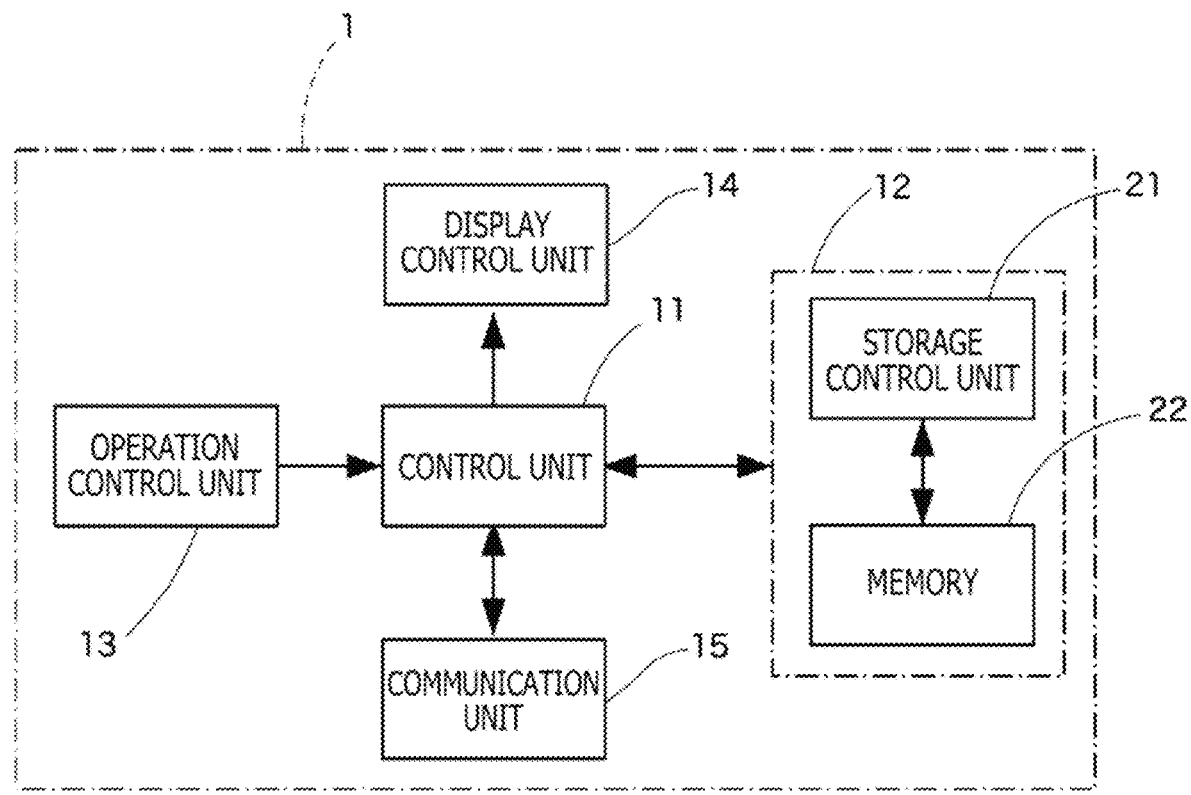
FIG. 5 is a configuration block diagram illustrating an information processing apparatus according to an embodiment of the present invention.

With reference to the drawings, embodiments of the present invention will be described in accordance with a configuration in FIG. 1. An information processing apparatus 1 according to the embodiments of the present invention is a home game machine or the like, is based on a background illustrated in FIGS. 2 and 3, and includes at least one of characteristic matters illustrated in FIG. 4. As illustrated in FIG. 5, the information processing apparatus 1 includes a control section 11, a storage section 12, an operation control section 13, a display control section 14, and a communication section 15.

The control section 11 is a program control device such as a central processing unit (CPU) and operates in accordance with programs such as game applications which are stored in the storage section 12.

The storage section 12 is connected to the control section 11 via an interconnect such as a SoC on-chip interconnect and holds programs executed by the control section 11 and various kinds of information required for processing of the control section 11. In the present embodiment, the storage section 12 includes a storage control section 21 and a memory 22. In this regard, the memory 22 is assumed to be a DRAM with an ECC processing function.

The storage control section 21 is a memory controller that controls recording data in the memory 22 or reading data from the memory 22 in accordance with instructions input from the control section 11. Detailed operations will be described below.

The operation control section 13 is connected to a game controller or the like to receive the contents of instruction operations of the user, and outputs the contents to the control section 11. The display control section 14 is connected to a display or the like to control the display or the like to display and output information in accordance with instructions input from the control section 11.

The communication section 15 is a network interface or the like that transmits and receives information to and from a server and the like to which the communication section 15 is connected via a network, in accordance with instructions input from the control section 11. The communication section 15 receives information transmitted to the information processing apparatus 1 via the network, and outputs the information to the control section 11.

Figure 18:
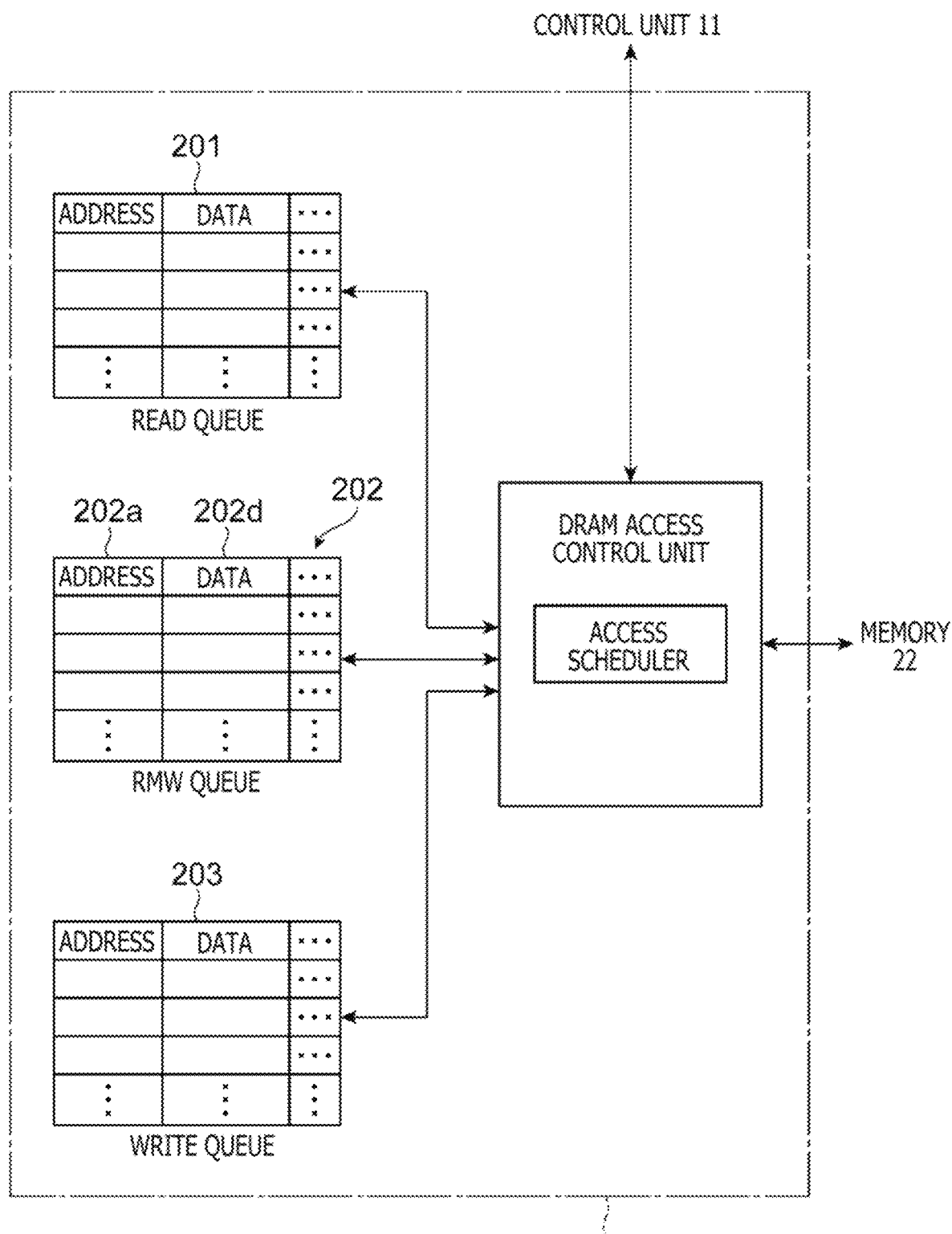
FIG. 18 is a block diagram illustrating a general configuration example of the memory controller according to an embodiment of the present invention.

In the present embodiment, the storage control section 21 used as a memory controller includes a read queue 201, a read modify write (RMW) queue 202, a write queue 203, and a DRAM access control section 204 as illustrated in FIG. 18.

In this regard, the read queue 201 includes a plurality of entries (storage regions), and each of the entries includes a buffer (read data queue 201d) holding data of a predetermined data length corresponding to a read/write data size for the memory 22 and an address paired with the buffer (read address queue 201a).

The RMW queue 202 also includes a plurality of entries (storage regions), and each of the entries includes a buffer (RMW data queue 202d) holding data of the predetermined data length corresponding to the read/write data size for the memory 22 and an address paired with the buffer (RMW address queue 202a). Each of the entries of the RMW queue 202 can be used for processing of read modify write executed on data stored in the memory 22 at a certain address.

Note that the number of entries of the RMW queue 202 may be specified by using parameters P0 to P4 or the like, described below. Specifically, P0: Band to be achieved in a case where small size data smaller than the predetermined data length is consecutively written (time required to write or read data of a unit size). For example, in a case of using a DRAM that delivers performance similar to that of the memory 22 used and that requires no ECC processing, the band that can be achieved when write requests for write of data of the small size are consecutively executed may be P0.

P1: The number of steps of RMW write processing per unit time which are required to achieve the band P0. In other words, P1=P0/(data length of write data).

P2: The number of write requests for write of the small data of a size less than the predetermined data length which are expected to occur per unit time, the number being estimated on the basis of a use case.

P3: In the control of the DRAM access control section 204, the maximum value of the time when the small size write data smaller than the predetermined data length resides in the RMW data queue 202d (the maximum value of a processing time required for read modify write executed by the storage control section 21 corresponding to a memory controller). In this regard, the data residence time may or may not include the time when the data is held after the data write is completed.

P4: In the control of the DRAM access control section 204, the minimum value of the time when the small size write data smaller than the predetermined data length resides when the read modify write has a priority equivalent to that of other processing.

These parameters are used, and the number of entries of the RMW queue 202 is N1=P1×P3/P0, for example, with the worst condition taken into account. Alternatively, in another example, the number of entries of the RMW queue 202 is N2=P2×P4/P0 with provision of the smallest number of entries taken into account (with the minimum number of entries provided).

Furthermore, the write queue 203 includes a plurality of entries (storage regions), and each of the entries includes a buffer (write data queue 203d) holding data of the predetermined data length and an address paired with the buffer (write address queue 203a).

The DRAM access control section 204 includes an access scheduler 214. The access scheduler 214 receives an application for a data write to the memory 22 or a data read from the memory 22, accumulates information representing the contents of the application, and processes the application represented by the information accumulated, in an order determined in accordance with a predetermined rule.

The access scheduler 214 transmits and receives signals to and from the memory 22 at a predetermined access bit rate, and on the basis of the application, executes, on the memory 22, write processing of data stored in the write queue 201 or the RMW queue 202. Additionally, on the basis of the application, the access scheduler 214 reads data from the memory 22 and writes the data to the read queue 203 or the RMW queue 202.

Note that the access bit rate between the memory 22 and the storage control section 21 corresponding to the memory controller may be set higher than an access bit rate for a memory executing no ECC processing in a case where data write/read is executed in accordance with identical specifications. For example, in a case where the access bit rate for a memory executing no ECC processing is 14 Gbps, the access bit rate in the present embodiment is set to 16.5 Gbps.

The DRAM access control section 204 receives requests for writing of data from the control section 11 to the memory 22 (memory write requests) and requests for reading of data from the memory 22 (memory read requests). Then, in response to these requests, the DRAM access control section 204 operates as follows.

[Data Write] In the present embodiment, the DRAM access control section 204 receives a memory write request along with data related to the request (data to be written to the memory 22) and a write destination address.

The data length of the data related to the request is checked. In a case where the DRAM access control section 204 determines that the data length is shorter than a preset processing unit (less than the processing unit), the storage control section 21 itself performs a read modify write operation. Note that the processing unit is, for example, defined as a read/write data size (ECC processing unit or pipeline processing unit) for the memory 22.

On the other hand, in a case where the data length is equal to the preset processing unit, the DRAM access control section 204 stores the write destination address and data received in the write queue, and applies, to the access scheduler 214, for a write to the memory 22 on a timely basis. This operation is similar to the operation of general memory controllers, and thus detailed description of the operation is omitted.

To perform the read modify write operation, the DRAM access control section 204 stores the write destination address and data received in the RMW queue 202 (step 1). At this time, in a case where the RMW address queue 202a includes no entry storing an address matching the write destination address received, the write destination address is accumulated in the RMW address queue 202a with an empty entry, and the data received is accumulated in the RMW data queue 202d with the entry.

Additionally, in a case where the RMW address queue 202a includes an entry storing an address matching the write destination address received, the data received is stored in the RMW data queue 202d. This processing will be described below (step 1a described below).

Figure 10:
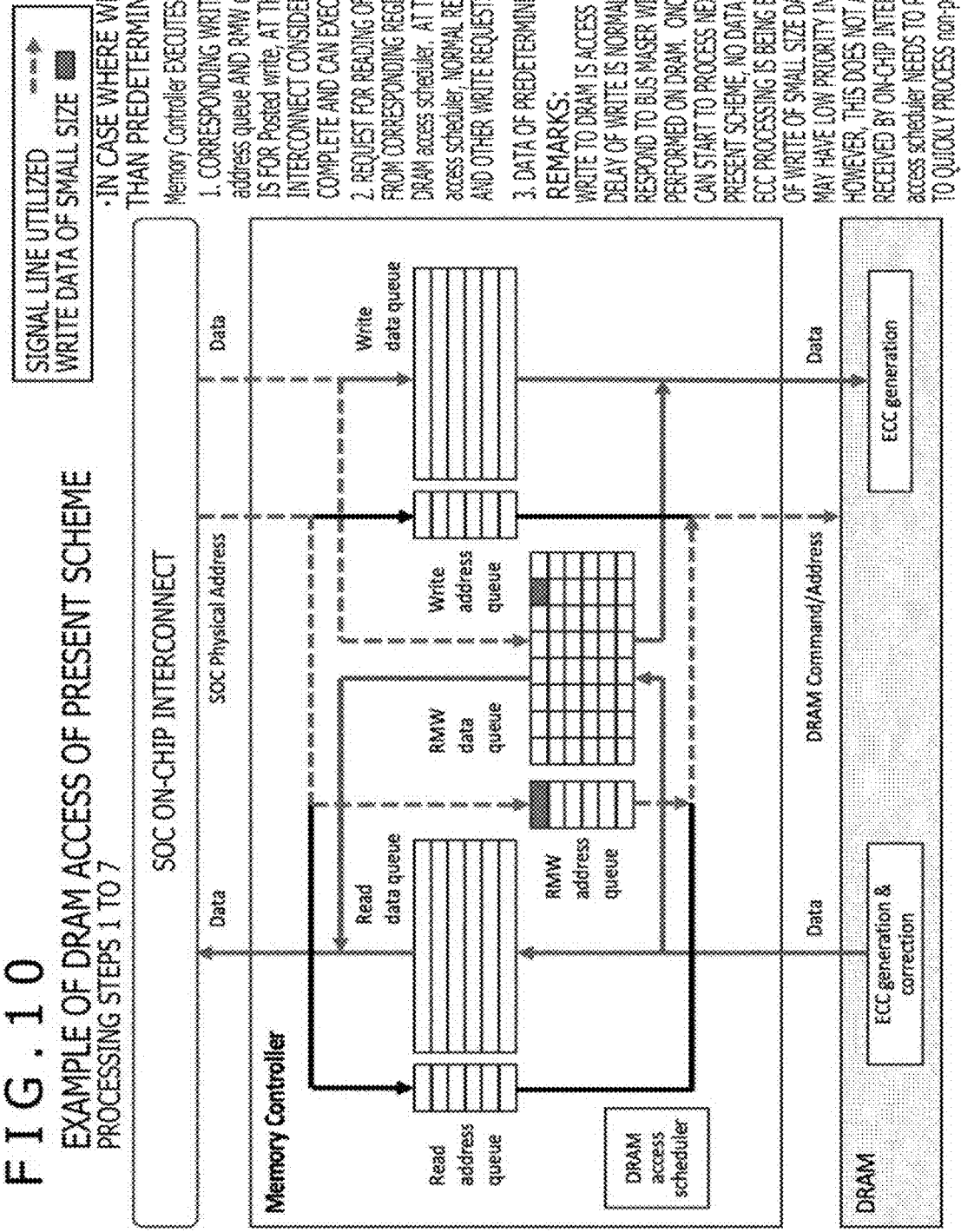
FIG. 10 is an explanatory diagram illustrating an example of a control method executed by the memory controller according to an embodiment of the present invention.
Figure 11:
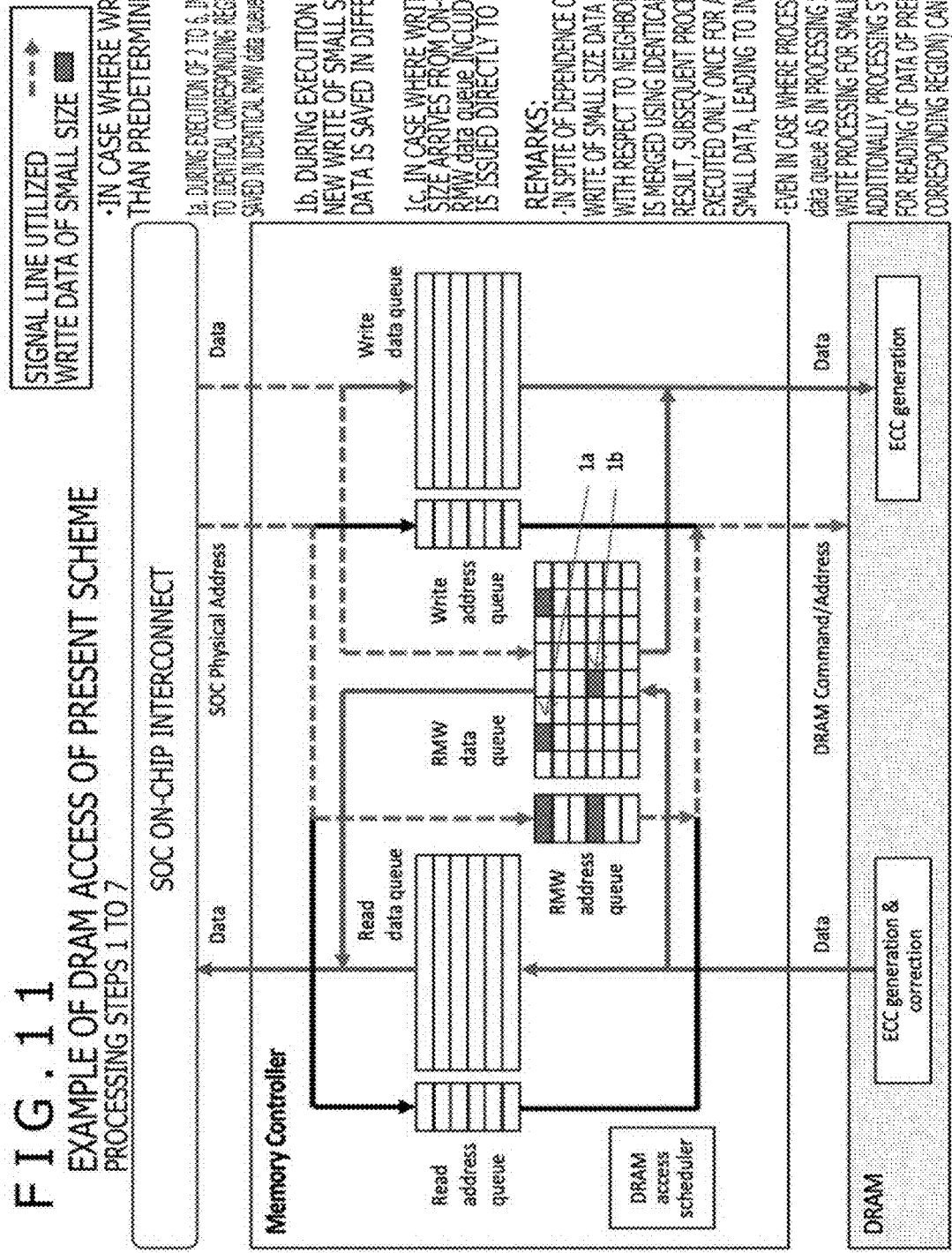
FIG. 11 is another explanatory diagram illustrating an example of a control method executed by the memory controller according to an embodiment of the present invention.
Figure 12:
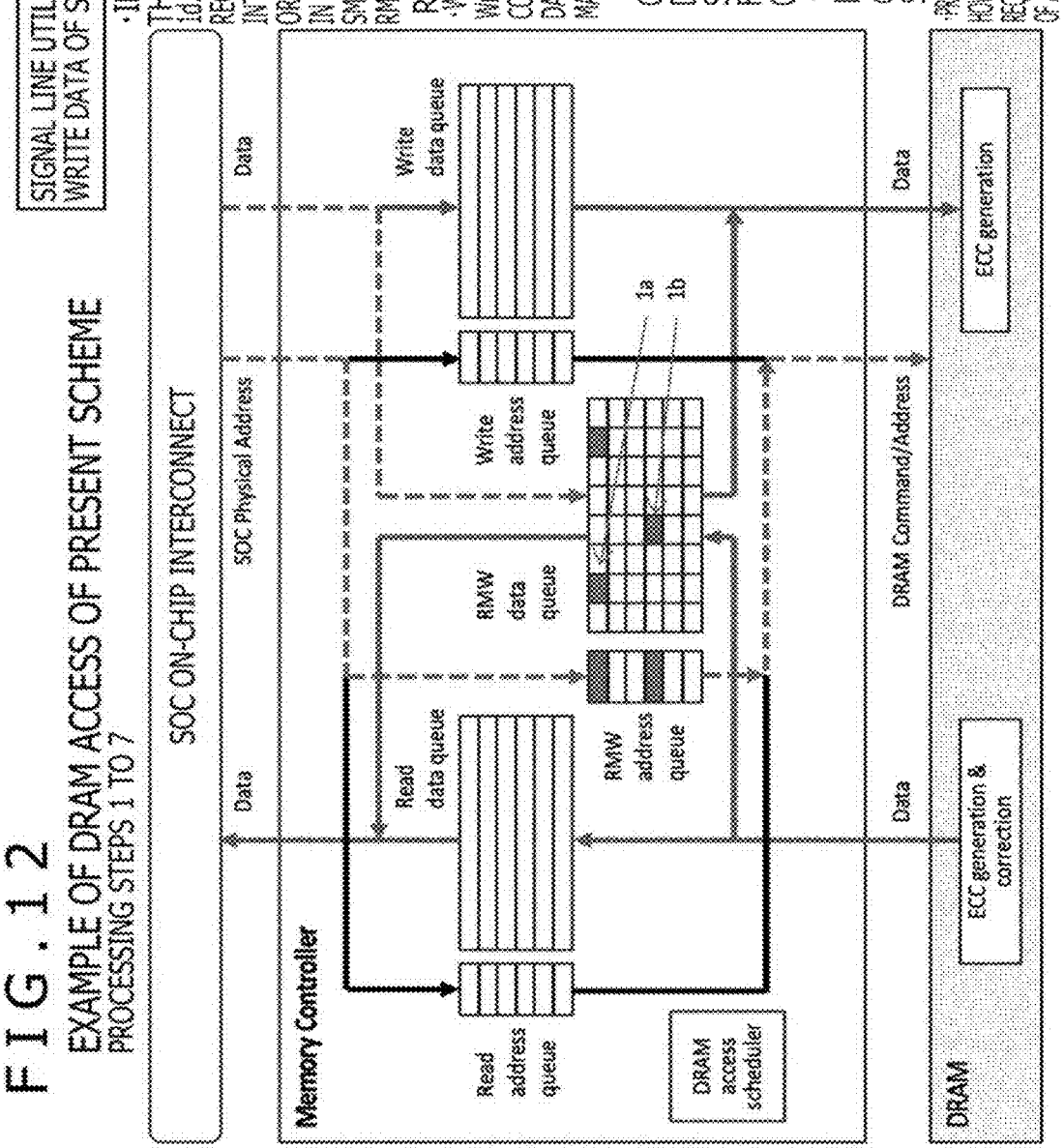
FIG. 12 is yet another explanatory diagram illustrating an example of a control method executed by the memory controller according to an embodiment of the present invention.
Figure 13:
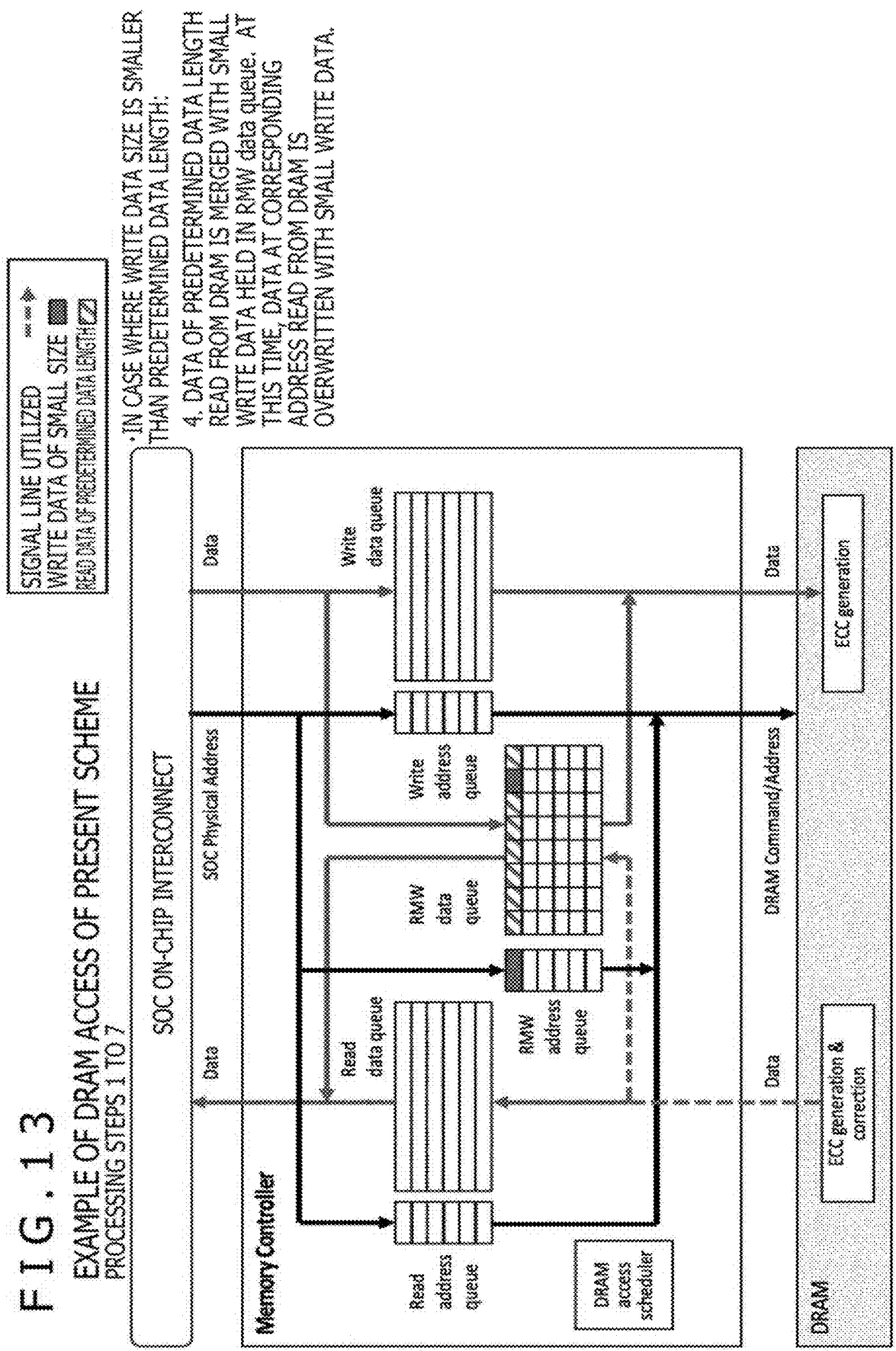
FIG. 13 is still another explanatory diagram illustrating an example of a control method executed by the memory controller according to an embodiment of the present invention.
Figure 14:
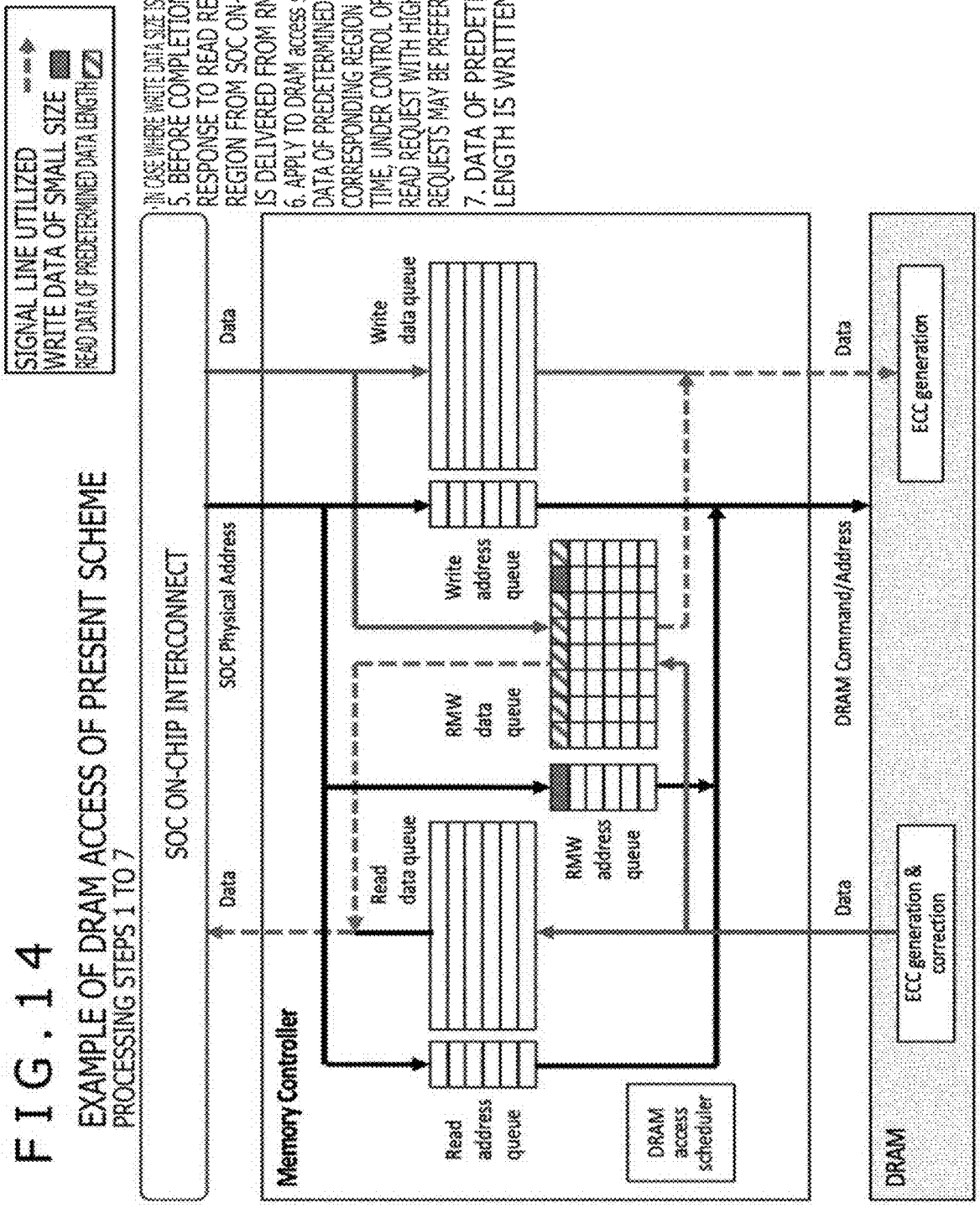
FIG. 14 is further another explanatory diagram illustrating an example of a control method executed by the memory controller according to an embodiment of the present invention.
Figure 15:
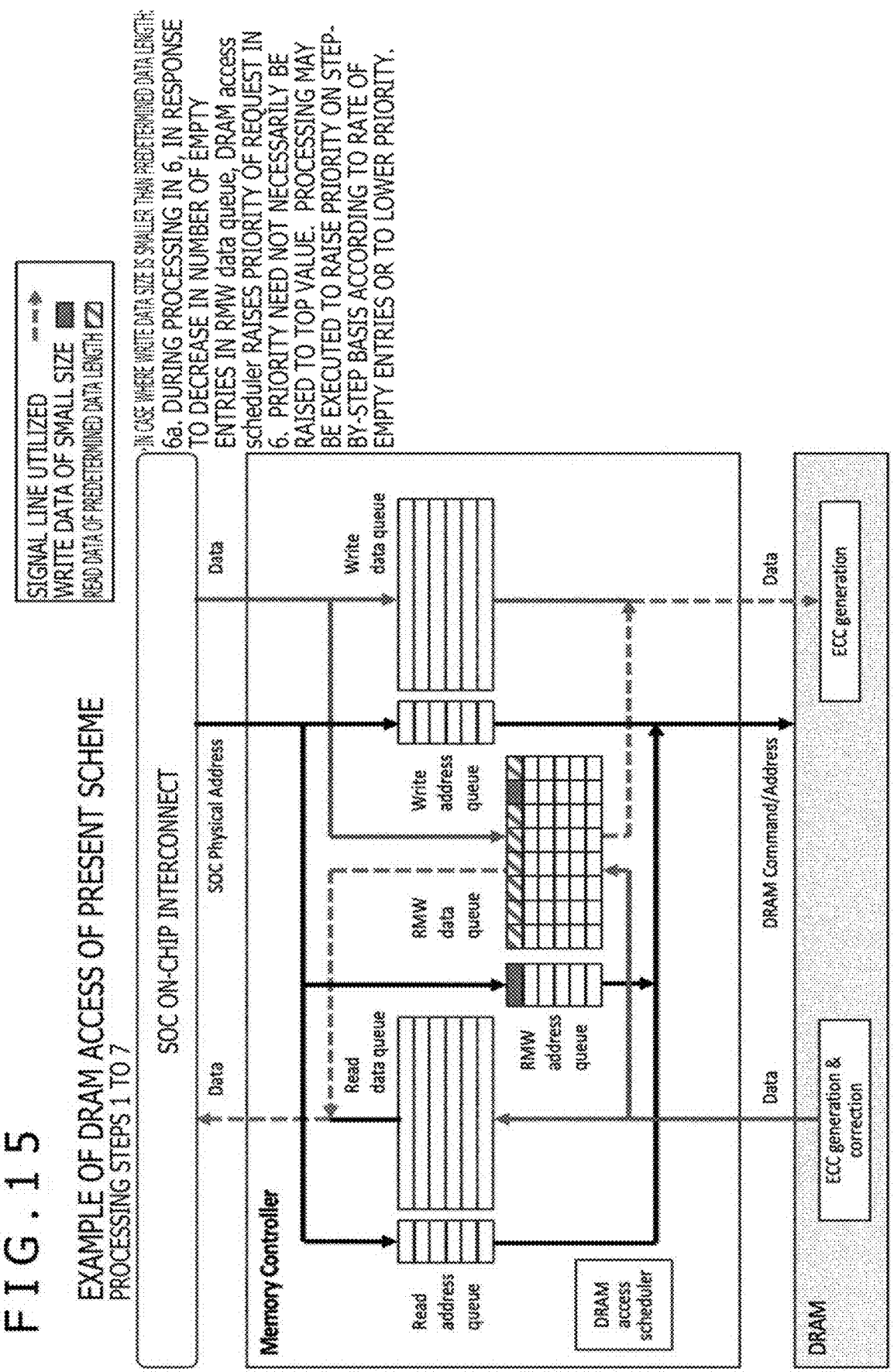
FIG. 15 is further another explanatory diagram illustrating an example of a control method executed by the memory controller according to an embodiment of the present invention.
Figure 16:
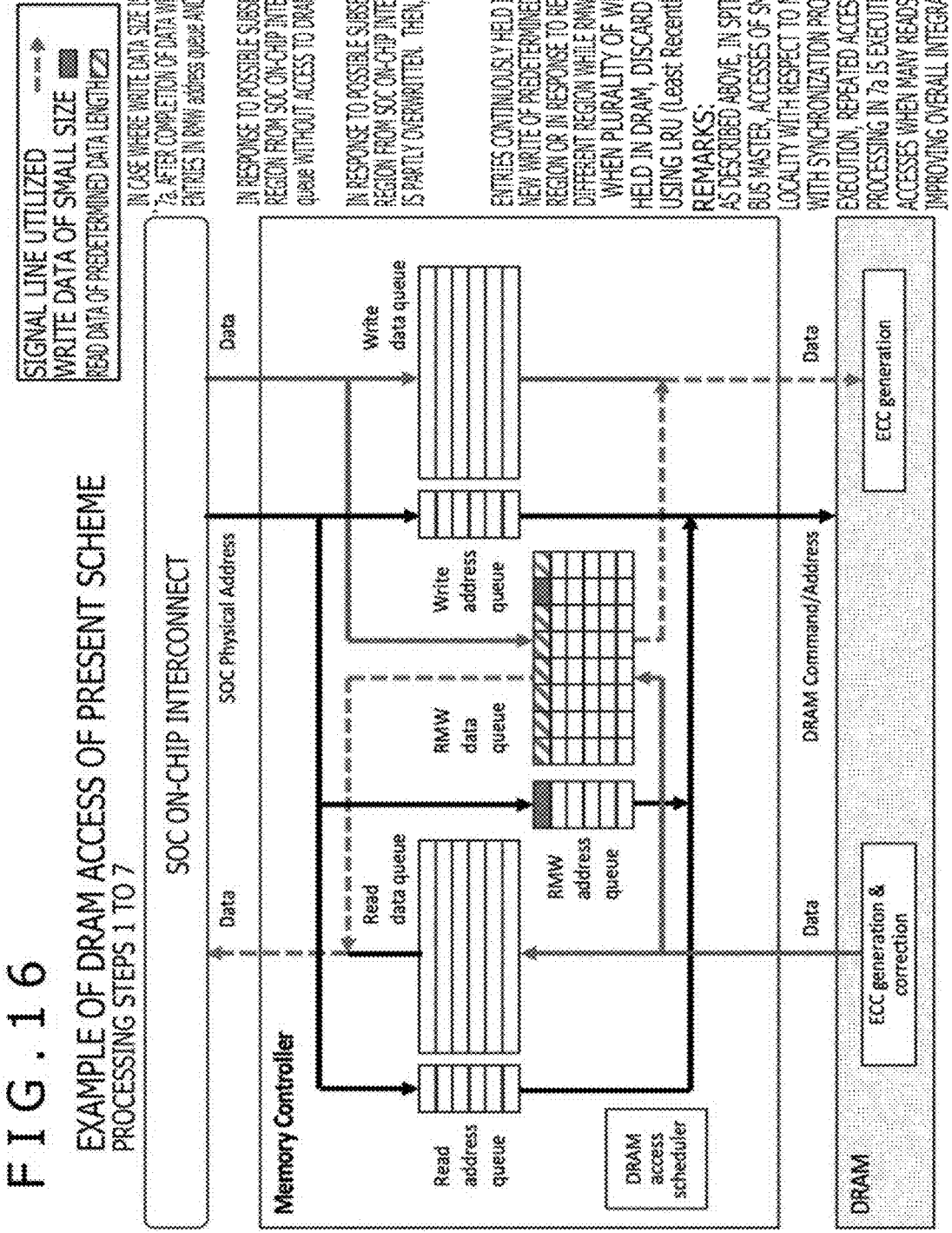
FIG. 16 is further another explanatory diagram illustrating an example of a control method executed by the memory controller according to an embodiment of the present invention.

In this case, the data length is less than the predetermined data length corresponding to the read/write data size for the memory 22, and thus the data received is used to overwrite a part of data of the predetermined data length determined by the write destination address. Thus, the DRAM access control section 204 records the data received at a corresponding position in a buffer of the predetermined data length in the RMW data queue 202d (the other portions are represented by preset values, for example, "0." Alternatively, in a case where any data has been recorded in connection with a previous read or write request, the data is kept untouched). The RMW data queue being partially colored in FIG. 10 and the like indicates that the data is recorded as described above.

In a case of performing a delayed write to the memory 22, the control section 11 assumes that the data write is completed at this point of time, and then executes subsequent processing.

The DRAM access control section 204 applies, to the access scheduler 214, for a read of data currently written to the address of the write destination address received (step 2).

In response to the application, the access scheduler 214 reads, from the memory 22, the data currently written to the address of the write destination address (step 3). Note that, in a case where any of the accesses to the memory 22 applied for is to be prioritized, the access scheduler 214 may preferentially process this access. In this case, step 2 and step 3 are not necessarily executed temporally consecutively.

The DRAM access control section 204 synthesizes (merges) the data read by the access scheduler 214 and the data stored in step 1 (step 4). In other words, the part of the read data which corresponds to the data related to the write request is overwritten with the data related to the write request, and resultant data is accumulated in the corresponding entry in the RMW data queue 202d.

Subsequently, when the control section 11 submits a read request for a read of the data stored at the address corresponding to the write address before step 7 is completed, the DRAM access control section 204 reads the data from the RMW data queue 202d corresponding to the RMW address queue 202a storing the address, and outputs the data to the control section 11 (step 5). Step 5 is not necessarily executed.

The DRAM access control section 204 applies, to the access scheduler 214, for a write to the corresponding address in the memory 22, of the data in the RMW data queue 202d on which the processing in step 4 has been completed (step 6).

In response to the application in step 6, the access scheduler 214 writes the data in the RMW data queue 202d on which the processing in step 4 has been completed, to the address held in the corresponding entry in the RMW address queue 202a (step 7: memory commitment).

Then, in response to newly receiving a memory write request from the control section 11 while the processing from step 2 to step 6 is in execution (the processing is hereinafter referred to as in-execution processing for distinction), the DRAM access control section 204 checks the data length of the data related to the request. Then, in a case where the data length is less than a preset processing unit, the DRAM access control section 204 determines whether or not the RMW address queue 202a includes an entry storing an address matching a write destination address received with the memory write request.

In this case, in a case where the RMW address queue 202a includes an entry storing the address matching the write destination address received, the data received is merged with the data already stored in the RMW data queue 202d with the entry (referred to as the corresponding entry), and resultant data is stored in the RMW data queue 202d with the entry (step 1a).

Specifically, when, in a storage region in the memory 22 determined by the write destination address received, data (referred to as data 1 for distinction) is already stored in the RMW data queue 202d in the corresponding entry from A1s to A1e with respect to the leading position of the storage region, if the data newly received is to be recorded from A2s to A2e with respect to the leading position of the storage region (this range in the storage region can be determined by information of the write destination address and the data length of the data received), the result of the merge is as follows.

(1) In a case where the range from A1s to A1e does not overlap the range from A2s to A2e: in this case, in the RMW data queue 202d in the corresponding entry after the merge, the data 1 is stored in the range from A1s to A1e, whereas the data 2 newly received is stored in the range from A2s to A2e.

(2) In a case where the ranges partially overlap as in the case of A1s<A2s<A1s<A2e and the like: in this case, the part of the data 1 already stored in the RMW data queue 202d which overlaps the data 2 newly received is overwritten with the data 2. In the case of A1s<A2s<A1s<A2e described above, in the RMW data queue 202d in the corresponding entry after merge, the corresponding part of the data 1 is stored from A1s to (A2s−1), whereas the data 2 is stored from A2s to A2e.

(3) In a case of A1s=A2s and A1s=A2e: also in this case, the overlapping part is overwritten with the data 2 newly received, and the data 2 is stored from A1s (equal to A2s) to A1e (equal to A2e) in the RMW data queue 202d in the corresponding entry after the merge processing.

The DRAM access control section 204 continues the in-execution processing after the processing in step 1a.

Note that, in a case where, during the processing from step 1 to step 7 described above, the DRAM access control section 204 newly receives a memory write request from the control section 11 and data related to the request has a data length less than the preset processing unit and where the RMW address queue 202a includes no entry storing an address matching a write destination address received with the memory write request, then as described above, the write destination address is accumulated in the RMW address queue 202a with an empty entry (step 1b), and execution of processing of step 2 and subsequent steps related to the entry is separately started.

Additionally, during processing in step 1b, in a case where the RMW address queue 202a with an empty entry is absent, the DRAM access control section 204 records the write destination address and data received in the write queue 203, and applies, to the access scheduler 214, for a write to cause the access scheduler 214 to execute a write to the memory 22.

In the present embodiment, the DRAM access control section 204 thus includes a plurality of entries corresponding to storage regions that can be used for the processing of read modify write, and executes as many steps of processing of read modify write as the entries in parallel. This apparently conceals the processing time of read modify write.

Additionally, in the present embodiment, before the DRAM access control section 204 completes writing, to the memory 22, of data that is smaller than a predetermined processing unit and that corresponds to an address (during processing of read modify write) as described above, when the control section 11 submits another write request for a write, to the address, of data smaller than the predetermined processing unit, the DRAM access control section 204 merges the contents of these data write requests and executes a write of data to the memory 22 (continues the processing of read modify write).

Note that, during the processing of read modify write executed on data corresponding to a certain write destination address, in response to a write for writing, to the write destination address, data of a data length equal to the predetermined processing unit, the DRAM access control section 204 may delete the contents of an entry in the RMW queue 202 corresponding to the write destination address and suspend the processing of read modify write corresponding to the write destination address in a case where no read request for a read from the address has hitherto been submitted. Then, the DRAM access control section 204 records, in the write queue 203, the write destination address related to the write instruction received from the control section 11 and the data of a data length equal to the predetermined processing unit, and applies, to the access scheduler 214, for a write to cause the access scheduler 214 to execute the write to the memory 22.

[Read of data] Additionally, the DRAM access control section 204 receives a data read request from the control section 11 along with a read source address. The DRAM access control section 204 checks whether or not the RMW address queue 202a includes an entry storing an address matching the read source address received.

In this case, in a case where the RMW address queue 202a includes no entry storing the address matching the read source address received, the DRAM access control section 204 records the read source address of the memory 22 in the read queue 201, and applies, to the access scheduler 214, for a read of data stored at the address.

The access scheduler 214 schedules the data read applied for according to the priority of reading of data from the memory 22. Subsequently, in response to reading the data, the access scheduler 214 stores the read data in the read queue 201 in association with the corresponding address, and outputs the data to the control section 11 on a timely basis. The processing in this case is an operation similar to a read of data from the general memory 22, and thus detailed descriptions are omitted here.

Additionally, in response to receiving the data read request along with the read source address, the DRAM access control section 204 executes processing described below in a case where the RMW address queue 202a includes an entry storing an address matching the read source address received.

The DRAM access control section 204 determines which of steps 1 to 7 described above the processing of write corresponding to the entry corresponds to. Then, in a case where the stage of the processing corresponds to a stage before step 3 (corresponds to a stage in which merge with the data in the memory 22 has not been performed), the DRAM access control section 204 waits until the merge is performed.

When the processing of write corresponding to the entry corresponds to a stage after step 4 (the processing may correspond to that after memory commitment) or when the execution of standing-by step 4 described above is completed, the DRAM access control section 204 reads the data in the entry in the RMW data queue 202d and outputs the data to the control section 11 as requested data.

Note that, for the standing-by described above, the access scheduler 214 of the DRAM access control section 204 may provide control in such a manner as to increase the priority of processing of applying for the corresponding data read (read from the memory 22 to the RMW queue 202; processing in step 3 described above). For example, the control may be provided such that, after the current access to the memory 22 is completed, the processing is executed before an access based on another application.

Specifically, the access scheduler 214 references the addresses held in the read queue 201, the RMW queue 202, and the write queue 203 and controls the processing order of the access requests held in the respective entries, and at this time, for maximization of efficiency of access to the memory 22, the priority of processing is determined as follows.

Specifically, the access scheduler 214 controls the processing order in consideration of a bank and page configuration of the memory 22, the continuity of read and write, the data lengths for read and write, and the priority of requests from a bus master. At this time, the control is provided such that, in access requests from an identical bus master, the order of write and read is not reversed. Thus, data consistency or data coherency is maintained.

Thus, in a case of prioritizing processing of read from the memory 22 to the RMW queue 202 (processing in step 3) in the processing of read modify write corresponding to a certain address, the access scheduler 214 changes the processing order to an extent that the order of a write or read corresponding to an identical address is not changed, to provide control such that processing is executed in the order prioritized to the extent described above.

[Processing after Memory Commitment] In the processing of read modify write to the address stored in the RMW address queue 202a in any of the entries of the RMW queue 202, when the processing in step 7 (memory commitment) is completed, the DRAM access control section 204 may delete the address information and data stored in the entry to empty the entry.

Of course, the present embodiment is not limited to this example, and the DRAM access control section 204 may hold the address information and data stored in the entry (hereinafter referred to as the processed entry) in the RMW queue 202 related to the data on which the processing of memory commitment is completed, with the address information and data remaining untouched.

In this case, in response to receiving, from the control section 11, a read request for a read from the address related to the processed entry, the DRAM access control section 204 responds to the request to read the data stored in the processed entry (the data is also stored in the memory 22, the memory 22 is not accessed, and instead, the data stored in the processed entry is read) and outputs the data to the control section 11.

Additionally, in response to receiving, from the control section 11, a write request for a write of data to the address related to the processed entry, the DRAM access control section 204 writes data related to the write request to the RMW data queue 202d with processed entries. At this time, when the data related to the write request is less than the data length (burst length or the like) of the RMW data queue 202 related to the write request, the DRAM access control section 204 merges the data with the data stored in the corresponding RMW data queue 202d. In other words, the part of the data stored in the RMW data queue 202d which corresponds to the write request is partly overwritten with the data related to the write request. At this time, the DRAM access control section 204 removes this entry from the processed entries, and re-executes the processing in steps 6 and 7 (the processing of applying for a write of the data of the entry to the memory 22)

Additionally, in this example, with no empty entries in the RMW queue 202, in response to receiving, from the control section 11, a write request for a write to an address stored in none of the entries of the RMW queue 202, the DRAM access control section 204 executes the following processing.

Specifically, in this example, the DRAM access control section 204 selects one of the processed entries and overwrites the RMW address queue 202a and RMW data queue 202d with the processed entry with the address and data related to the request newly received from the control section 11. Then, the DRAM access control section 204 removes this entry from the processed entries.

In this regard, a method for selecting one of the processed entries may be random or may perform selection by using what is called an LRU (Least Recently Used) scheme. A widely known method can be adopted for selection processing by using the LRU scheme, and detailed descriptions are omitted here.

[Empty Entries in RMW Queue] Note that, in a certain example of the present embodiment, in a case where the number of empty entries (entries in the RMW queue 202 that are not in use or on which the processing in step 7 has been completed) in the RMW queue 202 is less than a predetermined threshold after the processing in step 6 of applying to the access scheduler 214 for a write of the data in the RMW data queue 202d on which the processing in step 4 has been completed, the access scheduler 214 may change the order of processing as described below.

In other words, the access scheduler 214 changes the order such that the processing related to step 6 applied for is preferentially executed. In this example as well, the access scheduler 214 advances the order of processing related to step 6 to the extent that the order of write and read corresponding to an identical address region is reversed. For this purpose, during application to the access scheduler 214 in the processing in step 6 described above, the DRAM access control section 204 performs the application while providing information indicating that the processing corresponds to step 6 described above. Then, the access scheduler 214 may record those of the steps of processing applied for and included in the queue which are related to the processing in step 6 in one of the steps of processing of read modify write, and the access scheduler 214 may record these steps of processing in association with information indicating that the steps of processing are related to the processing in step 6 in the processing of read modify write.

[Operations of Embodiments] As described above, according to the present embodiment, a plurality of entries are provided in the RMW queue, and a plurality of steps of RMW processing are executed in parallel (on a time sharing basis). Thus, instead of executing one step of RMW processing at a time, the processing is positively delayed, and access scheduling is performed in such a manner as to provide generally consecutive accesses to the memory 22, thus improving the use efficiency of the memory 22.

Additionally, during RMW processing executed on data stored at a certain address in the memory 22, when a write request for a write, to the address, of data less than a predetermined data length (burst length) is submitted before commitment to the memory 22 is completed, the data is merged with the data related to the address and located on an entry in the RMW queue.

Similarly, during RMW processing executed on data stored at a certain address in the memory 22, when a read request for a read from the address is submitted before commitment to the memory 22 is completed, the data stored at the address in the memory 22 is merged with the data in the corresponding entry in the RMW queue, and then the data stored in the RMW queue is output as a read result.

Furthermore, even after commitment to the memory 22 is completed, the data may be held, and the data stored in the RMW queue may be output in response to a subsequent read request for a read from the corresponding address unless the RMW queue becomes insufficient. In this example, buffers used for the RMW queue and the like and provided in the memory controller are preferably increased in number compared to such buffers in the related art.

According to the present embodiment, by adjusting the number of entries in the queues such as the RMW queue built in the memory controller and the residence time of entry contents, read modify write processing performance can be adjusted.

[Another Description of Operations of Embodiments] The operations of the information processing apparatus 1 of the present embodiment can also be described as follows.

In a case where a memory write request for a write of data less than the predetermined data length is submitted, the memory controller itself performs read modify write. In other words, the access is not directly issued to the memory, and the memory controller itself performs a read of data of the predetermined data length, integration with data less than the predetermined data length, and a memory write of an integration result in a predetermined data unit.

In this regard, specifically, in a case where a write request for a write of data less than an ECC processing unit size is submitted, the memory controller itself performs read modify write.

Additionally, in this regard, in a case where a write request for a write of data less than a memory pipeline processing unit (burst length), the memory controller performs read modify write.

The memory controller includes queues that temporarily hold access requests and on which the read modify write processing is executed.

The memory controller includes a plurality of entries in the queue on which the read modify write processing is executed, and executes a plurality of steps of processing in parallel, thus concealing the processing time of read modify write.

The memory controller in which an access requester assumes that the processing of the access is completed when the memory controller receives a memory write request for a write of data less than the predetermined data length, and can execute subsequent processing.

The memory controller does not necessarily match the order of arrival of memory access requests with the order of execution of the memory access requests, but the memory controller maintains data consistency.

The memory controller integrates a plurality of memory write requests for write of data less than the predetermined data length, and performs read modify write on a plurality of pieces of the data at a time.

The memory controller performs a delayed write of the results of the read modify write processing to the memory.

The memory controller schedules the memory access order by reducing the frequency of accesses to a memory array and a data bus for memory access in which read modify write is being performed to lower the priority of the read modify write processing and delay the processing, thus improving overall performance of memory accesses including other accesses.

In a case where a read request for a read from the address is submitted while, during read modify write, a read of data of the predetermined data length is being delayed, the memory controller changes scheduling of the memory access order to prioritize the read in the read request.

In a case where a read request for a read from the corresponding region is submitted before a write of read modify write results to the memory is completed, the memory controller supplies data from the corresponding queue entry.

When empty entries in the queue start to decrease while, during read modify write, a write of integration results to the memory in predetermined data units is being delayed, the memory controller changes scheduling of the memory access order to raise the priority of the write.

The memory controller does not discard the queue entry even after read modify write ends, and utilizes the queue entry for data supply for a read request for a read from the address and for integration of write to the address as necessary.

By adjusting the number of entries in the queues built in the memory controller and the residence time of entry contents, the read modify write processing performance can be adjusted.

FIG. 6 is an explanatory diagram illustrating a configuration example of the memory controller of the present embodiment. In the present embodiment, processors such as CPU/graphical processing unit (GPU)/digital signal processing (DSP), a direct memory access (DMA) engine, a Video Encoding/Decoding engine, a Display engine, and Peripheral input/output are connected together via a SoC on-chip interconnect, and operate as bus masters (initiators) to issue DRAM access requests.

Then, a plurality of DRAM access requests are held in each queue and issued to the DRAM in the order of control of a DRAM access scheduler to cause data input and output to be executed. The order of arrival of DRAM access requests at the memory controller does not necessarily match the order of issuance of the DRAM access requests to the DRAM. The order is changed on the basis of DRAM use efficiency and the priority of the access requests.

The memory controller receives commands such as a read request and a write request from the SOC on-chip interconnect via command lines not illustrated, in combination with addresses and data.

In FIG. 6, a data bus between the memory controller and the DRAM corresponds to unidirectional signals in FIG. 6, but the data bus may correspond to bidirectional signals.

In FIG. 6, the address queue and the data queue are each divided into a queue for read, a queue for write, and a queue for read modify write (RMW). However, these queues may be integrated together.

In a case where the queues are integrated together, the entries may be associated with data indicating which of read, write, and RMW each entry corresponds to.

A SOC physical address is converted into a DRAM command and an address via a converter not illustrated.

FIG. 6 depicts a case where the ECC processing circuits are built in the DRAM. However, the present embodiment is not limited to this configuration, and a case is possible in which the ECC processing circuits are located on an input side of the memory controller side (in dotted box portions).

As depicted in FIG. 7, the read queue, the write queue, and the RMW queue may each include a plurality of entries, and one entry may include a pair of an address (Adr n) paired with a buffer (Data n) that can hold data of a predetermined data length and a total of two valid bits not illustrated and respectively and individually indicating whether or not an address and data are held. Additionally, the arrival order of access requests is held by placing a restriction on the utilization order of the entries or providing each entry with numbering holding bits not illustrated.

A data buffer for RMW may include a plurality of valid bits to allow a plurality of pieces of small data to be held together within one entry. In FIG. 7, one entry that can hold the predetermined data length can hold up to eight pieces of small data (Dn1 to Dn8) and also includes eight valid bits. Accordingly, valid bits per entry include one bit for the address and eight bits for the data.

The read queue and the write queue may have similar configurations or may be configured such that the queue can exclusively hold one piece of data regardless of the data length as long as one entry is equal to or shorter than the predetermined data length as depicted in FIG. 7.

The DRAM access scheduler references valid addresses held in the read queue, the write queue, and the RMW queue, to control the processing order of access requests held in each entry. At this time, for maximization of DRAM access efficiency, the DRAM access scheduler controls the processing order mainly in consideration of a bank and page configuration of the DRAM, the continuity of read and write, the data lengths for read and write, and the priority of requests from the bus master. At this time, data consistency or data coherency is maintained as necessary on the basis of the request from the bus master. In other words, the control is provided as necessary such that, in access requests from an identical bus master, the order of write and read is not reversed.

Number of Required Entries in RMW Address Que and RMW Data Queue:

With reference to FIG. 8, the number of entries in the RMW address queue and the RMW data queue may be determined by using the following parameters as considerations.

P0: Band to be achieved in a case where small size data smaller than the predetermined data length are consecutively written. For example, P0 may be the band that can be achieved in a DRAM that requires no ECC processing when write requests for write of data of the small size are consecutively executed.

P1: The number of steps of read modify write processing per unit time, which are required to achieve P0, P1=P0/ (data length of data to be written).

P2: The number of write requests for write of the small size less than the predetermined data length, which are expected to occur per unit time, the number being estimated on the basis of a use case.

P3: In the control of the DRAM access scheduler, the maximum value of the time when the small size write data smaller than the predetermined data length resides in the RMW data queue (the maximum value of a processing time required for read modify write executed by the memory controller). The data residence time 7a described below may or may not be included.

P4: In the control of the DRAM access scheduler, the minimum value of the time when the small size write data smaller than the predetermined data length resides when the read modify write has a priority equivalent to that of other processing.

The number of entries (that is, the maximum number of executable steps of parallel processing in the present processing) is calculated from any of the following:

The number of entries with the worst condition taken into account, N1=P1×P3/P0 unit time The minimum number of entries, N2=P2×P4/P0 unit time Calculation examples are illustrated below:

$$N1 = P1 \times P3/P1 \text{ unit time} = ((1 \text{ GB/s})/(4 \text{ B})) \times (2 \text{ us})/(1 \text{ s}) = 512$$

In other words, the number of entries is 512 in a case where the worst condition is taken into account.

$$N2 = P2 \times P4/P2 \text{ unit time} = (32 \text{ M/s}) \times (1 \text{ us})/(1 \text{ s}) = 32$$

In other words, an example of the minimum number of entries is 32.

FIG. 9 is a diagram illustrating a conventional DRAM access processing method for comparison. As illustrated in FIG. 9, in normal DRAM read processing, addresses received from a SOC interconnect are temporarily held in the read address queue and output to the DRAM in the order controlled by the DRAM access scheduler, and the data read from the DRAM is temporarily written to the read data queue and output to the inside of the SOC after arbitration with the SOC interconnect.

Additionally, in the normal DRAM write processing, addresses and data received from the SOC interconnect are respectively temporarily held in the write address queue and the write data queue and output to the DRAM in the order controlled by the DRAM access scheduler. The data is then written to the DRAM.

Note that, in a case where the write data size is the predetermined data length (burst length), ECC processing in the DRAM is efficiently executed by pipeline processing, and an ECC processing delay can be concealed.

On the other hand, in a case where the write data size is smaller than the predetermined data length, a DRAM internal circuit executes processing including the following processing steps 1 to 6.

Step 1) Small size data received from the memory controller is saved to a temporary data region instead of being written to the memory array, Step 2) Data with the predetermined data length is read from the region memory array corresponding to the write target, Step 3) ECC calculation and error correction are performed on data in step 2), Step 4) The data in step 2) is partly overwritten with the data in step 1), Step 5) The ECC value is recalculated for the data in step 4), and Step 6) A new ECC value and data in step 5) are written back to the corresponding region memory array.

With reference to FIG. 3, there is a known problem in that, in a case where the write data size is smaller than the predetermined data length, a longer processing time has been required than in a case where masked write is used for processing in a DRAM requiring no ECC processing. In addition, during the corresponding processing, no other access can be processed by the corresponding DRAM bank, leading to reduced use efficiency of the write data queue and the DRAM and a reduced overall DRAM average transfer data rate for accesses including other accesses.

FIGS. 10 to 16 are diagrams illustrating a DRAM access processing method of an embodiment of the present invention. Note that, in a case where the write data size is the predetermined data length (burst length), processing similar to that in the related art is executed and thus that repeated descriptions are omitted.

On the other hand, in a case where the write data size is smaller than the predetermined data length, the memory controller executes the following processing steps 1 to 7 described below. The processing is executed in parallel and in an re-entrant manner.

Step 1. The write request is stored in the RMW address queue and the RMW data queue. In a case where the request corresponds to posted write, the bus master and the on-chip interconnect assume, at this point of time, that the write of the present data is completed and can execute subsequent processing.

Step 2. A request for a read of data with the predetermined data length from the region of the write target is applied for to the DRAM access scheduler. At this time, in the control of the DRAM access scheduler, normal read requests having higher priorities and other write requests may be preferentially issued to the DRAM.

Step 3. Data with the predetermined data length is read from the DRAM.

In the above description, the write to the DRAM is normally a posted write, that is, an access for which a delay in write is permitted and which requires no response to the bus master indicating that a write to the DRAM has been executed. Once step 1 is completed, the memory controller can initiate processing the next DRAM access. Additionally, in the present scheme, while ECC processing is in execution in the DRAM, no stacking occurs in the write data queue. Thus, the priority of completion of a write of small size data to the DRAM (processing to the following step 7 described below) may be set lower by the DRAM access scheduler.

However, this does not apply to a case where a write request received from the on-chip interconnect corresponds to a non-posted write. The DRAM access scheduler needs to provide control such that the non-posted write is immediately processed in spite of a possible decrease in efficiency of other accesses.

Step 1a. In a case where, while steps 2 to 6 are in execution, a new write of a small size data of the predetermined data length to the identical region is performed, the data is saved in the identical RMW data queue entry. Overwriting is also performed.

Step 1b. In a case where, while steps 1 to 7 are in execution, a new write of small size data to another region is performed, the data is saved in a different RMW data queue entry.

Step 1c. In a case where a new write request for a write of small size data arrives from the on-chip interconnect and where no empty entry is present in the RMW data queue, the access is issued directly to the DRAM via the write data queue.

Although, depending on the properties of the bus master, a write of small size data may have temporal locality for neighbor addresses. In such a case, merge is performed by using the identical RMW data queue entry.

As a result, the subsequent processing steps 4 to 7 can be executed simply by performing one access to a plurality of pieces of small data merged, increasing processing efficiency.

Even with processing in execution in another RMW data queue, the plurality of entries allow processing of write of small data to be performed in parallel.

Additionally, processing step 2 (application for a request for a read of data of the predetermined data length from the corresponding region) for the data in step 1b can be executed at any point of time in parallel. Accordingly, the DRAM access scheduler issues access requests for accesses including other accesses, to the DRAM in the optimum order, allowing maximization of use efficiency of the data bus.

Step 1d. In a case where, while steps 2 to 4 are in execution, a read request for a read from the corresponding region is submitted from the SOC on-chip interconnect, the DRAM access scheduler controls the processing order as necessary in such a manner as to immediately execute the request in step 2.

In a case where the target of the read request is within small data held by the RMW data queue, the data is supplied from the RMW data queue.

With a write request for a write of data of the predetermined data length held in the write data queue, in a case where a read request for a read from the corresponding region is submitted from the SOC on-chip interconnect before the write of data in the corresponding entry to the DRAM is completed, processing may be executed by using any of the following methods.

A) The memory controller saves the address of the read request in the read address queue, and the DRAM access scheduler controls the processing order in such a manner as to immediately execute write requests for write to an identical address, which are held in the write data queue. Subsequently, the read request is issued to the DRAM.

B) The memory controller includes a signal line not illustrated through which data can be output from the write data queue to the SOC on-chip interconnect, and the signal line is used to supply data from the write data queue.

Processing similar to that in A) may be executed in the RMW data queue. However, the RMW data queue is characterized in that, by intentionally causing write requests for write of small size data to reside in the RMW data queue for a relatively long time, integration of accesses such as in step 1a and scheduling with other DRAM accesses can be made more optimum, allowing maximization of the overall DRAM average transfer data rate.

Step 4. The data of the predetermined data length read from the DRAM is merged with the small write data held in the RMW data queue. At this time, the data corresponding to the address and read from the DRAM is overwritten with the small write data.

Step 5. In a case where a read request for a read from the corresponding region is submitted before a write to the DRAM is completed, the data is supplied from the RMW data queue.

Step 6. A request for a write of data of the predetermined data length from the region of the write target is applied for to the DRAM access scheduler. At this time, in the control of the DRAM access scheduler, normal read requests having higher priorities and other write requests may be preferentially issued to the DRAM.

Step 7. Data of the predetermined data length is written to the DRAM.

Additionally, when empty entries in the RMW data queue start to decrease during the processing in steps 6a. step 6, the DRAM access scheduler raises the priority of the request in step 6 as necessary. Rising to the top priority is not necessarily needed. Processing for raising or lowering the priority on a step-by-step basis according to the rate of empty entries may be performed.

Step 7a. After the write of the data to the DRAM is completed by the processing in step 7, the data in the entries in the RMW address queue and RMW data queue having been used may be held untouched.

Subsequently, in a case where a read request for a read from the corresponding region is submitted from the SOC on-chip interconnect, the data is supplied from the RMW data queue without access to the DRAM.

Subsequently, in a case where a new write of small size data to the corresponding region is provided from the SOC on-chip interconnect, partial overwriting of the identical RMW data queue entry is performed. Then, steps 2 to 7 are newly executed.

The entry continuously held in step 7a may be discarded when a new write request for a write of data of the predetermined data length to the identical address region is submitted or when there are no empty entries in the RMW data queue, a new write request for a write of small data to a different region is submitted. In a case where such a DRAM holds a plurality of RMW data queues in which all the entries are filled with data, the entry to be discarded may be determined by using an LRU scheme.

As described above, depending on the properties of the bus master, a data access for small size data may have temporal locality for neighbor addresses. In particular, in a case where synchronization processing such as polling is executed, an identical address may be repeatedly accessed.

With the processing in step 7a executed, when a lot of read from an identical region occur, other DRAM accesses are prevented from being hindered, thus improving the overall DRAM access performance. Similar control may be performed on the read data queue.

The targets of the present embodiment include, as illustrated in FIG. 17,
  Memories requiring ECC processing: specifically, memories in general that require error-correcting code processing at each predetermined data length and that are subjected to accesses for smaller data lengths,
  Memories having a restriction on the access data length: memories in general that do not support accesses for data lengths smaller than the predetermined data length, and memories in general that can conceal a processing delay by using pipeline processing and the like for the predetermined data length, but suffer from a processing delay or reduced throughput for accesses for smaller data lengths, and
  Other memories,
The above description mainly relates to the DRAM. However, similar processing can be executed on magnetic random access memory (MRAM), resistance random access memory (RRAM), ferroelectric random access memory (FRAM), Xpoint, negative AND (NAND) Flash, static random access memory (SRAM), and the like that require the similar processing. Additionally, in DRAMs, the processing can be applied to graphics double data rate 6 (GDDR6), double data rate 5 (DDR5), low power double data rate 5 (LPDDR5), and the like.

In the embodiment, the predetermined data length and the small size data length are, for example, the following sizes.
  Predetermined data length: 32 bytes
  Small size data length: 4 bytes, 8 bytes
  Additionally, with reference to FIG. 19, description will be given of a timing for a write of data to the memory 22 and a timing for a read of data from the memory 22, in the information processing apparatus of the present embodiment.

FIG. 19 depicts (a) an example of timing in a case where, in a memory access scheme in the related art, a memory executing no ECC processing is accessed, (b) an example of timing in a case where data of the predetermined data length (burst length) is written to a memory executing ECC processing, and (c) and (d) examples of timing in a case where, in an example of the present embodiment, the memory controller executes the read modify write processing.

As illustrated in FIG. 19, in a known example, when data is written to the memory twice, the first write (represented as "another access" in FIG. 19) and the current write (in FIG. 19, indicated as the "corresponding access" and illustrated by a shaded block background, and in a case where ECC processing is executed, the current write is assumed to correspond to a write request for a write of data of a data length less than the burst length corresponding to the ECC processing unit) are executed at timings described below.

First, a memory executing no ECC processing requires a total of nine clock cycles including two clock cycles required to submit each write request and seven clock cycles required to initiate a write of data.

On the other hand, in a case where ECC processing is executed, even when data transfer related to the last write request is performed in parallel, a total of 16 clock cycles are required including eight clock cycles required to initiate data transfer in response to reception of the first data write request and eight clock cycles required to initiate transfer of data related to the current write request.

In other words, substantially twice a time difference occurs depending on whether or not ECC processing is executed.

In contrast, in a case where the method of the present embodiment is used to write data, RMW processing is separately executed, and thus data read requires a total of 27 clock cycles including two clock cycles required to receive a request+25 clock cycles required for read processing. However, the read completes the read modify write processing (FIG. 19(c)).

In other words, in the present embodiment, the DRAM access control section 204 avoids executing the required read modify write (RMW) processing as integral read modify write processing without change, in other words, avoids sequentially executing processing in the order of read, merge, and write.

In the present embodiment, the DRAM access control section 204 divides the required read modify write processing into read processing, merge processing, and write processing for execution. Then, for a plurality of DRAM accesses occurring and arriving at the DRAM access control section 204 as needed, the DRAM access control section 204 of the present embodiment consecutively performs those of the DRAM accesses which improve efficiency (in other words, reduce the number of required clock cycles) when simultaneously executed (consecutively executed).

Specifically, in an example of the present embodiment, the DRAM access control section 204 consecutively performs an access for the read processing of the read modify write processing (corresponding access) and an access for another read processing (not limited to read processing of another read modify write; this is hereinafter referred to as another access) (FIG. 19(c)).

In a memory requiring ECC processing, a data read (an access for the read processing of the read modify write (corresponding access)) requires a total of 27 clock cycles including two clock cycles required to receive a request+25 clock cycles required for the read processing. However, causing the corresponding access and another access to be consecutively performed leads to only two additional clock cycles actually consumed due to the addition of the access for the read processing for the read modify write processing. In other words, compared to independent issuance of the read processing for the read modify write processing, the consecutive execution allows the processing to be achieved in a short time by 25 clock cycles.

Additionally, the DRAM access control section 204 executes, on the RMW queue 202, the merge processing of the read modify write processing as soon as read data arrives at the DRAM access control section 204.

Then, the DRAM access control section 204 causes consecutive execution of an access for the write processing of the read modify write processing and an access for another write processing (another access not limited to the write processing of another read modify write)(FIG. 19(d)).

In a memory requiring ECC processing, a data write requires a total of 10 clock cycles including two clock cycles required to receive a request+eight clock cycles required for the write processing. However, causing the corresponding access and another access to be consecutively performed leads to only two additional clock cycles actually consumed due to the addition of the write access for the read modify write processing. In other words, compared to independent issuance of the write of the read modify write processing, the consecutive execution allows the processing to be achieved in a short time by eight clock cycles.

Note that, also in a memory requiring no ECC processing, an access for the write processing (corresponding access) and an access for another write processing (another access not limited to the write processing of another read modify write) can be executed consecutively (FIG. 19(a)). This requires a total of nine clock cycles including two clock cycles+seven clock cycles required for the write processing. However, causing the corresponding access and another access to be consecutively performed leads to only two additional clock cycles actually consumed due to the addition of the write access for the read modify write processing.

Accordingly, in a case where, in response to a write request for a write of data less than the burst length corresponding to the ECC processing unit, accesses are consecutively executed to reduce the number of required clock cycles, a memory requiring ECC processing requires a total of three additional clock cycles including two clock cycles for a read and one clock cycle for a write. This case requires less additional clock cycles than a case in which normal ECC processing is executed in a memory requiring ECC processing and which requires nine additional clock cycles as depicted in FIG. 19(b).

In this regard, in a case where the memory 22 (DRAM) is configured such that, when consecutively processed, a plurality of accesses need to be intended for an identical bank or page, the DRAM access control section 204 references the target of each of the accesses and performs scheduling such that the accesses to the identical bank or page are consecutively processed.

Additionally, in this case, in a case where the memory 22 (DRAM) is configured such that, with an identical bank or page, even consecutive execution of a mixture of read processing and write processing can be achieved by using a smaller number of clock cycles than execution of processing for an independent access, the DRAM access control section 204 takes this into account in scheduling.

Figure 20:
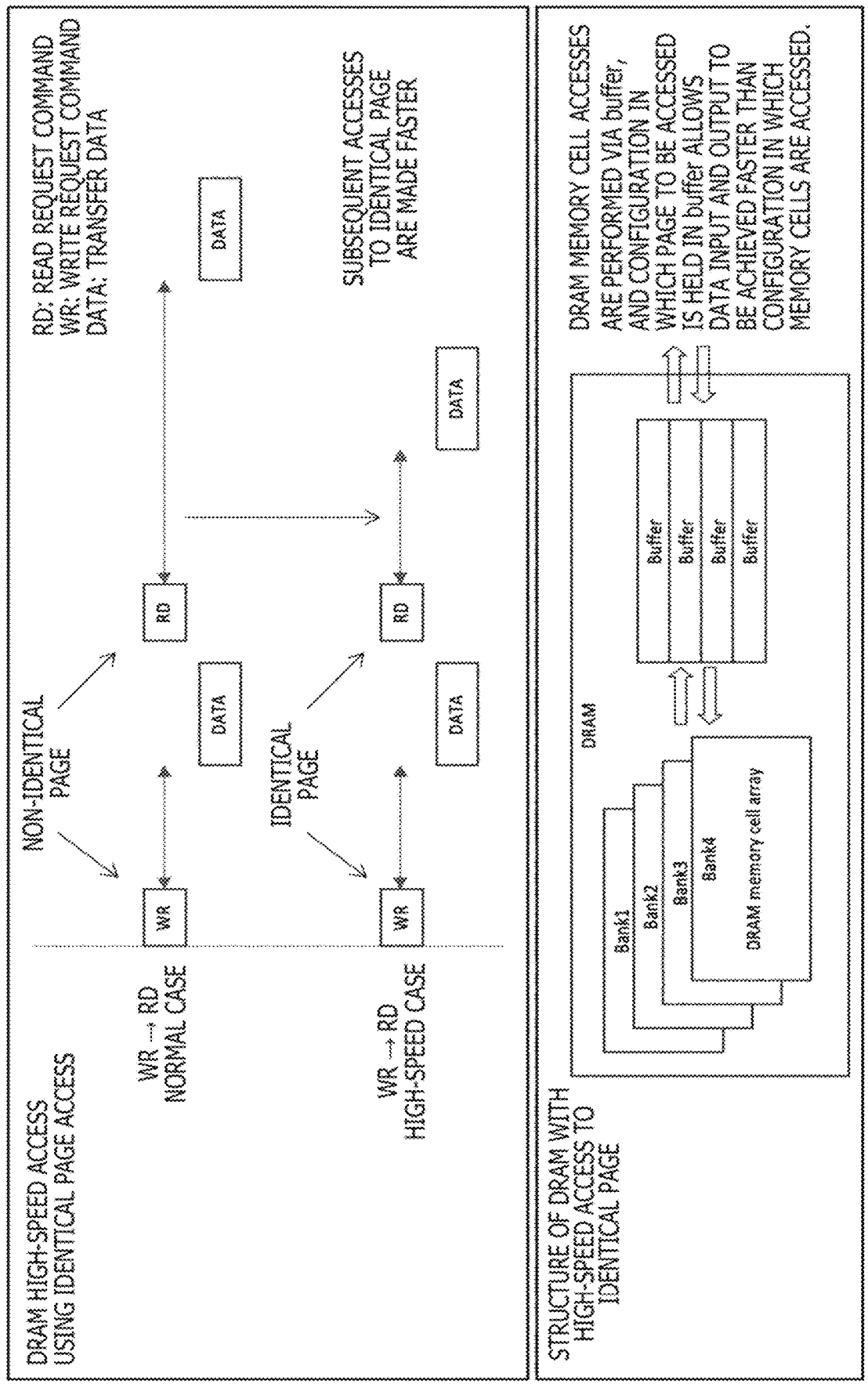
FIG. 20 is another explanatory diagram illustrating an example of operation timings for the memory controller according to an embodiment of the present invention.

The memory 22 (DRAM) that can even achieve consecutive execution of a mixture of read processing and write processing by using a smaller number of clock cycles than execution of processing for an independent access is configured such that memory cells in the DRAM are accessed via a buffer and corresponds to a case where data of a page to be accessed is saved in the buffer (FIG. 20: structure of DRAM with high speed access to identical page).

Specifically, as illustrated in FIG. 20, in a case where the queue includes write processing and read processing intended for an identical page, the DRAM access control section 204 performs control such that the write processing and the read processing are consecutively executed without any change in order (WR→RD high-speed case). Thus, compared to a case of consecutive addresses to different page (non-identical pages), the above-described case allows the write processing and the read processing to be executed by using a small number of clock cycles. In other words, the DRAM access control section 204 may also execute consecutive processing with a mixture of read processing and write processing.

In the present embodiment, the DRAM access control section 204 positively consecutively executes a plurality of accesses as described above to reduce the number of clock cycles required. Thus, with a request for read modify write held in the RMW queue 202, the DRAM access control section 204 may delay execution of the read modify write processing instead of immediately executing the processing in response to the request. Positively delaying the read modify write processing facilitates matching (scheduling) in which read processing and write processing included in one step of read modify write processing are executed consecutively along with another access.

Additionally, thus, in the memory 22 requiring ECC processing, three clock cycles additionally required for the processing of the present embodiment can be concealed by using two methods described below.

One of the methods includes providing a relatively large number of entries in the RMW queue 202 and increasing the number of data for the read modify write processing that can be held in parallel per a unit time.

As described above, the number of entries in the RMW queue 202 may be determined on the basis of the number of steps of processing required for the read modify write. By scheduling a plurality of accesses with sufficient time and a sufficient degree of parallelism, a reduction in efficiency of memory accesses is avoided. In a case where the memory accesses involve an idle time, this time can also be used to execute the read processing and write processing required for the read modify write processing.

Additionally, the other method is reducing the length of one clock cycle, that is, raising an access bit rate. This method also enables the throughput of the read modify write processing per unit time to be made equivalent to the throughput in a memory requiring no ECC processing.

For example, in accesses to the DRAM, under the worst condition in which only data accesses for data less than the burst length corresponding to the ECC processing unit occur consecutively, nine clock cycles are required in the related art and three additional clock cycles are further required, and thus clock frequency may be raised by being multiplied by $(9+3)/9=1.333$. In other words, under the condition in which the occurrence frequency of data accesses for data less than the burst length corresponding to the ECC processing unit is 50%, the clock frequency may be raised by being multiplied by 1.166, which corresponds to half the clock rate raising rate. For example, in a memory requiring no ECC processing, in a case where the access bit rate is 14 Gbps, the present condition is satisfied by raising the access bit rate to 16.5 Gbps.

Additionally, in the information processing apparatus of the present embodiment, the control section 11 may change the access bit rate as needed on the basis of the amount of data access for data less than the burst length corresponding to the ECC processing unit in each application. In this case, two possible methods will be described below in which the amount of data access for data less than the burst length is determined.

A first method includes preliminarily (tentatively) executing an application to be performed, obtaining, by measurement, the occurrence frequency and amount of data access for data less than the burst length corresponding to the ECC processing unit, that is, obtaining a value P2' corresponding to P2 already described, and compiling a database of an access bit rate required to deliver performance equivalent to that of a system by using a memory requiring no ECC processing, along with the identifier of each application. In this regard, when the application is executed in a system by using a memory requiring ECC processing, the required access bit rate is set with reference to the database on the basis of the identifier.

Specifically, on the basis of P2' obtained by measurement and a maximum residence time P3 for read modify write processing defined by the access scheduler of the present system, whether the number of entries in the RMW queue 202 of the present system is sufficient can be calculated. For example,
assuming that P2'=18 M/s and that P3=2 us,
the number of entries required for the RMW queue 202 is:

(18 M/s)×(2 us)/(1 s)=36.

On the other hand, in a case where the number N of entries in the RMW queue 202 mounted in the present system is 32, the RMW queue 202 becomes full unless the access bit rate is raised, preventing maintenance of processing performance equivalent to that of a memory requiring no ECC processing. In this case, the access bit rate raising rate required is 36/32=1.125.

In a second method for determining the amount of occurrence, when each application is executed in a system by using a memory requiring ECC processing, the DRAM access control section 204 dynamically observes the usage situation of the RMW queue 202 to measure P2'.

In this example, when the occurrence of read modify write processing exceeding a preset threshold is detected within a certain period of time, the access bit rate is dynamically raised. The threshold may be set at multiple levels. On the basis of the threshold, lowering the access bit rate in the opposite direction may be dynamically controlled as necessary. A method for determining the access bit rate is similar to the first method described above, and thus repeated descriptions are omitted.

REFERENCE SIGNS LIST

11: Control section
12: Storage section
13: Operation control section
14: Display control section
15: Communication section
21: Storage control section
22: Memory

The invention claimed is:

1. An information processing apparatus comprising:
a memory; and
a memory controller writing data to the memory in response to a write for writing the data to the memory, wherein
the memory executes error correction processing for each data of a predetermined data length, and
the memory controller executes, in place of the memory, read modify write processing in a case where a data length of the data related to the write instruction is smaller than the predetermined data length, wherein:
the memory controller divides a sequence of read modify write processing into separate read processing, merge processing, and write processing, and causes consecutive execution of the read processing or write processing and another read processing or write processing,
the memory controller includes a memory queue, separate from the memory, as a temporary storage region usable for the read modify write processing, where the queue includes a plurality of entries each holding read data or write target data, and
information related to the read modify write processing to be executed is held in the queue to delay execution of the read processing and the write processing included in the read modify write processing, such that even after the read modify write processing ends, data in one or more of the entries of the queue holding the data corresponding to the ended processing is not discarded, and is used for data supply for a read request for a read from an address in the memory at which the data is stored or for integration of write data to be written to the address.

2. The information processing apparatus according to claim 1, wherein the memory controller includes a plurality of storage regions usable for the read modify write processing, and executes the read modify write processing in parallel.

3. The information processing apparatus according to claim 1, further comprising:
a control section providing a write instruction to cause the memory controller to write data, wherein
at a point of time when the control section outputs the write instruction to cause the memory controller to write data, the control section assumes that the write to the memory is completed, and executes subsequent processing.

4. The information processing apparatus according to claim 1, wherein in response to newly receiving, during the read modify write processing, a write request for a write of data shorter than the predetermined data length to an address of a write destination identical to an write destination for data on which the read modify write processing is being executed, the memory controller merges the data on which the read modify write processing is being executed with data related to the write request newly received and continues the read modify write processing.

5. The information processing apparatus according to claim 1, wherein:
as the read modify write processing, the memory controller stores the data related to the write instruction in a storage region usable for the read modify write processing, reads the data of the predetermined data length stored at an address in the memory corresponding to the address of the write destination for the data related to the write instruction, merges the data of the predetermined data length with the data stored in the storage region, and writes the data of the predetermined data length obtained by the merge to a corresponding address in the memory, and
in the read modify write processing, in response to receiving a read instruction to execute a read of data from a corresponding address before the read of the data of the predetermined data length from the memory is completed, the memory controller provides control such that the read of the data of the predetermined data length is preferentially executed.

6. The information processing apparatus according to claim 5, wherein in the read modify write processing, in response to receiving the read instruction to execute the read of the data from the corresponding address before processing of the write of the data of the predetermined data length to the memory is completed, the memory controller outputs, as data read from the memory, the data of the predetermined data length stored in the storage region usable for the read modify write processing.

7. The information processing apparatus according to claim 1, wherein an access bit rate between the memory controller and the memory is set higher than in a case in which a memory executing no error correction processing is used.

8. The information processing apparatus according to claim 1, wherein the memory controller divides a sequence of read modify write processing into read processing, merge processing, and write processing, and causes consecutive execution of the read processing or write processing and another read processing or write processing.

9. The information processing apparatus according to claim 1, wherein the memory controller provides control in such a manner as to consecutively execute the read processing included in the read modify write processing and another read processing and to consecutively execute the write processing included in the read modify write processing and another write processing.

10. The information processing apparatus according to claim 1, wherein:
the memory includes a plurality of banks or pages, and
the memory controller divides one step of the read modify write processing into read processing, merge processing, and write processing for execution, and causes consecutive execution of the read processing or write processing and another read processing or another write processing accessing an identical bank or page in the memory.

11. The information processing apparatus according to claim 1, wherein the access bit rate of access to the memory is set on a basis of an amount of occurrence of the read modify write processing.

12. A control method for an information processing apparatus including a memory and a memory controller writing data to the memory in response to a write for writing the data to the memory, the control method comprising:
executing error correction processing for each data of a predetermined data length, and
executing, in place of the memory, read modify write processing in a case where a data length of the data related to the write instruction is smaller than the predetermined data length, wherein:
the memory controller divides a sequence of read modify write processing into separate read processing, merge processing, and write processing, and causes consecutive execution of the read processing or write processing and another read processing or write processing,
the memory controller includes a memory queue, separate from the memory, as a temporary storage region usable for the read modify write processing, where the queue includes a plurality of entries each holding read data or write target data, and
information related to the read modify write processing to be executed is held in the queue to delay execution of the read processing and the write processing included in the read modify write processing, such that even after the read modify write processing ends, data in one or more of the entries of the queue holding the data corresponding to the ended processing is not discarded, and is used for data supply for a read request for a read from an address in the memory at which the data is stored or for integration of write data to be written to the address.

* * * * *